(12) United States Patent
Hatchman et al.

(10) Patent No.: US 10,017,681 B2
(45) Date of Patent: Jul. 10, 2018

(54) CORROSION INHIBITORS

(71) Applicant: RHODIA OPERATIONS, Paris (FR)

(72) Inventors: Kevan Hatchman, Wolverhampton (GB); Gareth Collins, Katy, TX (US); Chris Jones, Cheslyn Hay (GB)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 15/108,693

(22) PCT Filed: Jan. 8, 2015

(86) PCT No.: PCT/EP2015/050206
§ 371 (c)(1),
(2) Date: Jun. 28, 2016

(87) PCT Pub. No.: WO2015/104308
PCT Pub. Date: Jul. 16, 2015

(65) Prior Publication Data
US 2016/0326424 A1    Nov. 10, 2016

(30) Foreign Application Priority Data
Jan. 8, 2014    (GB) .................................. 1400299.2

(51) Int. Cl.
C09K 8/54      (2006.01)
C23F 11/167    (2006.01)

(52) U.S. Cl.
CPC .......... C09K 8/54 (2013.01); C23F 11/1676 (2013.01); *C09K 2208/32* (2013.01)

(58) Field of Classification Search
None
See application file for complete search history.

(56) References Cited

U.S. PATENT DOCUMENTS

| 3,664,807 A | 5/1972 | Redmore |
| 4,560,493 A * | 12/1985 | Scharf ..................... C23G 1/00 134/2 |
| 2008/0108537 A1* | 5/2008 | Rees ...................... A01N 59/00 510/258 |
| 2008/0274013 A1* | 11/2008 | Stevens .................... C09K 8/54 422/7 |

FOREIGN PATENT DOCUMENTS

EP    0009247 A1    4/1980
GB    2432154 A     5/2007

OTHER PUBLICATIONS

Queffélec, et al., "Surface Modification Using Phosphonic Acids and Esters", Chemical Review 2012, 112(7), pp. 3777-3807.

\* cited by examiner

*Primary Examiner* — John J Figueroa

(57) ABSTRACT

The instant invention relates to the use of a compound selected from C2-C30 alkyl phosphonic acids, salts thereof, esters thereof, and mixtures thereof, to inhibit corrosion of a metal component by an aqueous fluid containing dissolved gases in an industrial hydrocarbon system.

20 Claims, No Drawings

CORROSION INHIBITORS

This application is a U.S. national phase entry under 35 U.S.C. § 371 of International Application No. PCT/EP2015/050206, filed on Jan. 8, 2015, which claims priority to British Application No. 1400299.2, filed on Jan. 8, 2014. The entire contents of these applications are incorporated herein by this reference.

The present invention relates to the use of alkyl phosphonic acids, salts thereof or esters thereof to inhibit the corrosion of a metal component by dissolved gases in an aqueous industrial hydrocarbon system, especially in oilfield systems such as oil production wells. It also relates to the use of alkyl phosphonic acids, salts thereof or esters thereof to enhance the ability of a surfactant formulation to inhibit the corrosion of a metal component by dissolved gases in an aqueous industrial hydrocarbon system, especially in oilfield systems such as oil production wells.

BACKGROUND TO THE INVENTION

It is well known that steel and other metal surfaces can corrode in the presence of aqueous environments, especially acidic aqueous environments such as those found in subterranean wells. In this regard, aqueous fluids passing through such subterranean formations, and especially those found in hydrocarbon production wells, often contain high concentrations of corrosive materials such as dissolved gases, including hydrogen sulphide and carbon dioxide.

Alloy technology and galvanisation have resulted in materials that can withstand some incidental contact with corrosive environments, but in a number of industrial applications more prolonged contact with corrosive environments occurs. This is especially the case in industrial hydrocarbon systems, such as hydrocarbon exploration, recovery and refining. In particular, during the working life of an oil or gas well there are various conduits and other components in the production zone that encounter considerable corrosion.

Therefore during the life of an oil or gas production well, the well (and especially the production zone within the well) will be expected to experience problems with corrosion due to dissolved gases. For example, corrosion of metallic components, such as downhole tubulars, is common and is evidenced by surface pitting, localized corrosion and loss of metal. Metallic surfaces subject to such corrosion include carbon steels, ferritic alloy steels, and high alloy steels such as chrome steels, duplex steels, stainless steels, martensitic alloy steels, austenitic stainless steels, precipitation-hardened stainless steels and high nickel content steels.

Corrosion inhibitors are therefore widely used in oil and gas production wells and pipelines to reduce corrosion of metal components and to therefore prevent consequential production equipment failures.

Some of the most widely used surfactant corrosion inhibitors in oilfields involve nitrogen-based chemistry, for example they include those based on quaternary ammonium salts and fatty amine, fatty amidoamine, hydroxyethyl or aminoethyl imidazolines. For example, imidazolines are commonly used as corrosion inhibitors, and are viewed as the industry standard. However, these chemicals are known to have poor aquatic toxicity.

The OSPAR Convention (Oslo-Paris Convention for the Protection of the North-East Atlantic) has a control system in place, whereby a standard environmental dataset for each chemical substance in a formulation to be used in the North-East Atlantic Ocean is required. This is called the Harmonized Mandatory Control System (HMCS). The environmental dataset includes results for biodegradation, bioaccumulation and marine aquatic toxicity. Other conventions and regulations also determine environmental standards to be met.

These environmental criteria, and in particular, toxicity to marine algae, are typically not met by many substances used in commercially available corrosion inhibitors. For example, measurement of the effective concentration of the substance that is sufficient to cause a reduction in growth rate for more than 50% of the algae population (the $EC_{50}$) is often less than 1 mg/l for in commercially available corrosion inhibitors, and in some cases less than 0.1 mg/l. In contrast, $EC_{50}$ values should in fact ideally be >1 mg/l, more preferably >10 mg/l. In other examples, the commercially available corrosion inhibitors show poor biodegradation, or are considered likely to bioaccumulate.

Therefore although their performance attributes are well known, a major disadvantage for the above mentioned nitrogen-based surfactants is their environmental profile. In this regard, these compounds may have poor biodegradability, may have the potential to bioaccumulate in the ecosystem and are harmful or toxic to aquatic species.

Furthermore, cationic nitrogen-based surfactants may also have problems associated with being incompatible with other components, such as anionic corrosion inhibitors.

In addition, when modifications are made to such nitrogen-based surfactants to try to improve their environmental profile, e.g. when the hydrophobic chain length is reduced, this often has a detrimental effect on their corrosion inhibition performance.

There is therefore a continuing need for products for use in the oil and gas industry, which have acceptable environmental properties, especially in terms of aquatic toxicity and biodegradability, whilst also being effective in terms of corrosion inhibition, and preferably with a reduced foaming and emulsification potential.

SUMMARY OF THE INVENTION

The present invention provides, in a first aspect, the use of a compound selected from C2-C30 alkyl phosphonic acids, salts thereof, esters thereof, and mixtures thereof, to inhibit corrosion of a metal component by an aqueous fluid containing dissolved gases in an industrial hydrocarbon system.

As the skilled person will appreciate, oxygen and acid gases such as carbon dioxide and hydrogen sulphide are the most common corrosive agents. Additional sources of corrosion are natural organic acids found in the produced fluids (see Chapter 8, 'Production Chemicals for the Oil and Gas Industry', ed. M A Kelland, CRC Press, 2009).

In particular, therefore, the compound may be used to inhibit corrosion of metal components by an aqueous fluid containing dissolved acid gases, such as hydrogen sulphide and carbon dioxide.

In a preferred embodiment, the compound may be used to inhibit corrosion of metal components by an aqueous fluid containing dissolved gases, such as hydrogen sulphide and carbon dioxide, in an industrial oil or gas well. The industrial oil or gas well is preferably a production well.

The compound may in particular be used to inhibit corrosion of metal components by an aqueous fluid containing dissolved gases, such as hydrogen sulphide and carbon dioxide, in a production zone of an industrial oil or gas well.

The inhibition of corrosion may involve preventing corrosion occurring and/or may involve reducing the extent to which corrosion does occur.

It has been found that these alkyl phosphonic acids (as well as salts or esters thereof) are suitable for use in industrial hydrocarbon applications, because they meet the required environmental criteria, and provide a surprisingly effective corrosion inhibition performance in relation to preventing or reducing the level of corrosion caused to metal components by the corrosive dissolved gases present in an aqueous industrial hydrocarbon system. These dissolved gases, especially hydrogen sulphide and carbon dioxide, are well known to present problems of corrosion for the metal components.

In addition, these alkyl phosphonic acids (as well as salts or esters thereof) exhibit good thermal stability and so are suitable for use in high temperature environments, such as in topside installations for industrial hydrocarbon systems (e.g. in refineries, transport infrastructure (pipelines, storage tanks) and the like) and in sub-surface installations for industrial hydrocarbon systems (e.g. within oil wells or gas wells and especially within production zones). This option is not available for some corrosion inhibition chemistries (e.g. alkyl phosphate esters). The temperature range of production fluids in topside facilities is generally around 60 to 90° C. and the temperatures in the well can be 130 to 150° C. or higher.

The alkyl phosphonic acids (as well as salts or esters thereof) have also been found to be highly compatible with other surfactants, in particular anionic, amphoteric and non-ionic chemistries. In addition, surprisingly, they can be used in combination with one or more surfactants to enhance corrosion inhibition of metal components in those industrial hydrocarbon applications (e.g. by dissolved gases in an oilfield or gas field environment) whilst not having adverse effects on those surfactants in terms of environmental acceptability or in terms of reduced foaming.

Therefore these alkyl phosphonic acids and salts and esters thereof have been identified as providing a number of advantages over known corrosion inhibitor systems.

The present invention also provides, in a second aspect, a method of inhibiting corrosion of a metal component that is in contact with, or will be in contact with, an aqueous fluid containing dissolved gases, especially acid gases such as hydrogen sulphide and carbon dioxide, in a production zone of an industrial oil or gas well, wherein the method comprises:
applying a compound selected from C2-C30 alkyl phosphonic acids, salts thereof, esters thereof, and mixtures thereof, to the metal component in the production zone or to the aqueous fluid that is in contact with, or will be in contact with, the metal component in the production zone.

In one embodiment the compound is applied to the metal component in the production zone. The metal component is in contact with, or will be in contact with, an aqueous fluid containing dissolved gases. Thus the metal component may already be in contact with an aqueous fluid that already contains dissolved gases, or may already be in contact with an aqueous fluid that will contain dissolved gases. Alternatively, the metal component may be one that will be in contact with an aqueous fluid that contains dissolved gases.

In one embodiment the compound is applied to an aqueous fluid in the production zone, wherein the fluid already contains dissolved gases or wherein the fluid will contain dissolved gases.

The inhibition of corrosion may involve preventing corrosion occurring and/or may involve reducing the extent to which corrosion does occur.

In a third aspect there is provided a formulation suitable for use in industrial hydrocarbon systems, wherein the formulation comprises:
from 0.1 to 80 wt %, e.g. from 0.1 to 60 wt %, such as from 0.5 to 50 wt %, of a compound selected from C2-C30 (such as C4-18, especially C6-18 and preferably C8-18) alkyl phosphonic acids, salts thereof, C1-6 alkyl esters thereof, and mixtures thereof; and
from 0.1 to 80 wt %, e.g. from 0.1 to 60 wt %, such as from 0.5 to 50 wt %, of surfactant selected from anionic surfactants, non-ionic surfactants, cationic surfactants, amphoteric surfactants, and mixtures thereof;
and wherein the formulation has an alkaline pH.

For example, the formulation may comprise from 0.1 to 60 wt %, such as from 5 to 50 wt %, of a compound selected from C2-C30 (such as C4-18, especially C6-18 and preferably C8-18) alkyl phosphonic acids, salts thereof, C1-6 alkyl esters thereof, and mixtures thereof; and from 0.1 to 80 wt %, such as from 5 to 80 wt %, of surfactant selected from anionic surfactants, non-ionic surfactants, cationic surfactants, amphoteric surfactants, and mixtures thereof.

Preferably the surfactant is selected from anionic surfactants, non-ionic surfactants, amphoteric surfactants, and mixtures thereof.

The alkyl phosphonic acids (as well as salts or esters thereof) have good compatibility with other surfactants, which may be anionic, non-ionic and amphoteric surfactants, therefore permitting formulations to be produced that comprise combinations of active agents for use in industrial hydrocarbon applications.

The formulation may be provided in liquid form or in solid form. When in liquid form, the alkyl phosphonic acid (or salt or ester thereof) will be immediately released. When in solid form, the alkyl phosphonic acid (or salt or ester thereof) will be released over time, thus there will be a delayed or controlled release. The alkyl phosphonic acid, salt or ester would be released as the formulation dissolves or disintegrates in the aqueous fluid.

The formulation may be used to inhibit corrosion of metal components in industrial hydrocarbon systems. The corrosion that is inhibited (prevented and/or reduced) may be due to contact with an aqueous fluid, especially an aqueous fluid containing dissolved gases.

Therefore the present invention also provides, in a fourth aspect, a method of inhibiting corrosion of a metal component that is in contact with, or will be in contact with, an aqueous fluid in an industrial hydrocarbon system, wherein the method comprises:
applying a formulation according to the third aspect to the metal component or to the aqueous fluid that is in contact with, or will be in contact with, the metal component.

In particular, the formulation may be used to inhibit corrosion of metal components by an aqueous fluid containing dissolved gases, such as acid gases, e.g. hydrogen sulphide and carbon dioxide. Therefore the aqueous fluid may already contain dissolved gases, such as hydrogen sulphide and carbon dioxide, or the aqueous fluid may be one that will contain dissolved gases, such as hydrogen sulphide and carbon dioxide.

The inhibition of corrosion may involve preventing corrosion occurring and/or may involve reducing the extent to which corrosion does occur.

The formulation may be used in an industrial oil or gas well. The industrial oil or gas well is preferably a production well. The formulation may in particular be used to inhibit corrosion of metal components by an aqueous fluid containing dissolved gases, e.g. acid gases such as hydrogen sulphide and carbon dioxide, in a production zone of an industrial oil or gas well.

In one embodiment the formulation is applied to the metal component in the production zone. The metal component is in contact with, or will be in contact with, an aqueous fluid containing dissolved gases. Thus the metal component may already be in contact with an aqueous fluid that already contains dissolved gases, or may already be in contact with an aqueous fluid that will contain dissolved gases. Alternatively, the metal component may be one that will be in contact with an aqueous fluid that contains dissolved gases.

In one embodiment the formulation is applied to an aqueous fluid in the production zone, wherein the fluid already contains dissolved gases or wherein the fluid will contain dissolved gases.

Although GB2432154A discloses the use of alkyl phosphonic acids to inhibit corrosion, this is in the context of inhibiting corrosion caused by THP+ salts. In GB2432154A it was recognised that the use of THP+ salts as biocides had the unwanted side effect of corrosion of ferrous surfaces but that the co-administration of alkyl phosphonic acid with the THP+ salt reduces or prevents the corrosive effect. As the skilled person would appreciate, if being used in an oilfield system the THP+ salts added as biocides would be dosed in the water injection system.

As discussed in GB2432154A, alkyl phosphonic acids are not specialist acid inhibitors. There was no teaching in the art that suggested the alkyl phosphonic acids of the present invention would be able to inhibit corrosion of a metal component by an aqueous fluid containing dissolved gases, especially acid gases such as hydrogen sulphide and carbon dioxide, in an industrial hydrocarbon system.

In particular, it is notable that this corrosion inhibition is suitably effected by use of the alkyl phosphonic acids in the production zones of industrial hydrocarbon system, e.g. in an oil production well or a gas production well. There was no teaching that these the alkyl phosphonic acids could be used in these locations. It is well known that it is challenging to identify compounds that can be used in such locations, in light of the need for acceptable environmental properties, especially in terms of aquatic toxicity and biodegradability, as well as being able to remain stable and effective under the elevated temperatures encountered in such locations.

In addition, there was no teaching that these alkyl phosphonic acids would be highly compatible with other surfactants. In particular, it was not predictable that that they would be usable with surfactants to enhance the corrosion inhibition of metal components in industrial hydrocarbon applications whilst not having adverse effects on those surfactants in terms of environmental acceptability or in terms of reduced foaming.

Indeed, the present invention has surprisingly identified that these alkyl phosphonic acids may synergistically enhance the corrosion inhibition of other surfactants that have the ability to inhibit corrosion of metal components. Therefore the corrosion inhibiting effect of existing surfactants can be enhanced.

DETAILED DESCRIPTION OF THE INVENTION

The present invention makes use of C2-C30 alkyl phosphonic acids (as well as salts or esters thereof). Therefore the alkyl group in these compounds is a C2-C30 alkyl group, which may be straight chain or may be branched. Of course, it will be appreciated that for C2 products these must be straight chain.

When the alkyl group is a branched alkyl, it may be branched at any position. In one embodiment, it is branched at the 2-position, e.g. the compound may be 2-ethyl hexyl phosphonic acid or iso-butyl phosphonic acid. In one embodiment, it is branched at the 1-position, e.g. the compound may be t-butyl phosphonic acid.

In one embodiment, when the alkyl group is a branched alkyl the branched section contains from 1 to 6 carbon atoms, such as from 1 to 5, or 1 to 4, or 1 to 3 carbon atoms, e.g. 1 or 2 carbon atoms. There may, for example, be one branch (as in 2-ethyl hexyl phosphonic acid or iso-butyl phosphonic acid) or two branches (as in t-butyl phosphonic acid).

In one embodiment, when the alkyl group is a branched alkyl the main chain contains from 1 to 18 carbon atoms or from 1 to 16 carbon atoms, such as from 1 to 12 carbon atoms, e.g. from 1 to 10 carbon atoms. In one such embodiment, when the alkyl group is a branched alkyl the main chain contains from 1 to 8 carbon atoms, such as from 1 to 7 carbon atoms, e.g. from 1 to 6 carbon atoms.

In one embodiment, when the alkyl group is branched it is a C3-C18 group. For example, it may be a C4-C18 branched alkyl, or a C4-C16 branched alkyl, or a C4-C14 branched alkyl, or a C4-C12 branched alkyl. In one embodiment, it may be a C5-C18 branched alkyl, or a C5-C16 branched alkyl, or a C5-C14 branched alkyl, or a C5-C12 branched alkyl. For example, it may be a C6-C18 branched alkyl, or a C6-C16 branched alkyl, or a C6-C14 branched alkyl, or a C6-C12 branched alkyl.

In one embodiment, the alkyl group in the alkyl phosphonic acid compounds is a C2-C24 straight chain or branched alkyl, such as a C2-C22 or C2-C20 straight chain or branched alkyl. In one preferred embodiment it may be that the alkyl group in these compounds is a C2-C18 straight chain or branched alkyl, such as C3-C18, C4-C18, C5-C18, C6-C18, C7-C18 or C8-C18 straight chain or branched alkyl.

In one embodiment, the alkyl group in these compounds is a C3-C30 straight chain or branched alkyl, such as a C4-C30 or C5-C30 or C6-C30 straight chain or branched alkyl. It may be that the alkyl group in these compounds is a C3-C24 straight chain or branched alkyl, such as a C4-C24 or C5-C24 or C6-C24 straight chain or branched alkyl.

In one embodiment, the alkyl group in these compounds is a C3-C22 straight chain or branched alkyl, such as a C4-C22 or C5-C22 or C6-C22 straight chain or branched alkyl. It may be that the alkyl group in these compounds is a C3-C20 straight chain or branched alkyl, such as a C4-C20 or C5-C20 or C6-C20 straight chain or branched alkyl.

It may be that the alkyl group in these compounds is a C3-C18 straight chain or branched alkyl, such as a C4-C18 or C5-C18 or C6-C18 straight chain or branched alkyl.

In one embodiment the alkyl group in these compounds is a C3-C6 straight chain alkyl or a C7-C18 straight chain or branched alkyl.

It may be that the alkyl group in these compounds is a C6-30 straight chain or branched alkyl, such as C6-C24 or C6-C22 or C6-C20. In one preferred embodiment the alkyl group is a C6-C18 straight chain or branched alkyl, more preferably a C6-C16 straight chain or branched alkyl.

It may be that the alkyl group in these compounds is a C8-30 straight chain or branched alkyl, such as a C8-C24 or C8-C22 or C8-C20 straight chain or branched alkyl.

In one preferred embodiment the alkyl group is a C8-C18 straight chain or branched alkyl, more preferably a C8-C16 straight chain or branched alkyl, such as a C8, C9, C10, C11, C12, C13 or C14 straight chain or branched alkyl group.

In one embodiment the compound is selected from 2-ethyl hexyl phosphonic acid, iso-decyl phosphonic acid, iso-dodecyl phosphonic acid, octyl phosphonic acid and lauryl phosphonic acid, and salts and C1-C6 esters thereof.

The salts thereof that may be used include salts with monovalent cations, such as an alkali metal (e.g. $Li^+$ or $K^+$ or $Na^+$) or $NH_4^+$ and salts with divalent cations, such as an alkaline earth metal (e.g. $Ca^{2+}$). Alkanolamine salts can also be mentioned as suitable options, e.g. methanolamine or ethanolamine.

Alkyl phosphonic acid chemistries may exhibit synergies in the presence of Ca, Zn, Mg and Al (see 'Surface Modification Using Phosphonic Acids and Esters', Clémence Queffélec; Marc Petit; Pascal Janvier; D. Andrew Knight; Bruno Bujoli, Chem. Rev. 2012, 112(7), 3777-3807). Therefore the inclusion of one or more of these ions may be contemplated.

The esters thereof that may be used may be esters with a C1-C6 straight chain or branched alkyl group, wherein the ester groups may be the same or different. In one embodiment the ester may be a dimethyl ester, a diethyl ester or a dipropyl ester. For example, the compound may be dimethyl octadecyl phosphonate or diethyl octadecyl phosphonate or dimethyl lauryl phosphonate.

Examples of commercially available compounds that may be used in the invention include, but are not limited to, 100% octyl phosphonic acid, 80% octyl phosphonic acid in 50/50 water/ethanol, 30% octyl phosphonic acid in water, 100% lauryl phosphonic acid, and 100% dimethyl octadecyl phosphonate. All of these materials are commercially available from Solvay.

The alkyl phosphonic acid used in the present invention may be of general formula (I)

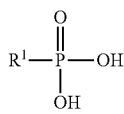

(I)

wherein $R^1$ is a C2-24 straight chain or branched alkyl, preferably a C2-C18 straight chain or branched alkyl, such as a C4-C18 or C6-C18 straight chain or branched alkyl, more preferably a C8-C18 straight chain or branched alkyl, or a C8-C16 straight chain or branched alkyl, such as a C8, C9, C10, C11, C12, C13 or C14 straight chain or branched alkyl group.

The ester of an alkyl phosphonic acid used in the present invention may be of general formula (II)

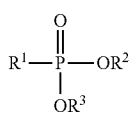

(II)

wherein
$R^1$ is a C2-24 straight chain or branched alkyl, preferably a C2-C18 straight chain or branched alkyl, such as a C4-C18 or C6-C18 straight chain or branched alkyl, more preferably a C8-C18 straight chain or branched alkyl, or a C8-C16 straight chain or branched alkyl, such as a C8, C9, C10, C11, C12, C13 or C14 straight chain or branched alkyl group, $R^2$ is H or a C1-C6 straight chain or branched alkyl, such as a C1 or C2 alkyl group or a C3 or C4 straight chain or branched alkyl group, $R^3$ is H or a C1-C6 straight chain or branched alkyl, such as a C1 or C2 alkyl group or a C3 or C4 straight chain or branched alkyl group, and wherein one or both of $R^2$ and $R^3$ is an alkyl group.

When a salt of an alkyl phosphonic acid is used, the alkyl phosphonic acid may be of formula (I) but in the form of a salt with monovalent cations, such as an alkali metal (e.g. $Li^+$ or $K^+$ or $Na^+$) or $NH_4^+$ and salts with divalent cations, such as an alkaline earth metal (e.g. $Ca^{2+}$). Alkanolamine salts can also be mentioned as suitable options, e.g. methanolamine or ethanolamine.

The industrial aqueous system may, in one embodiment, be an aqueous system in a hydrocarbon plant; this may be a plant for exploration, recovery, refining or distribution of hydrocarbon. For example, the aqueous system may be an oil or gas plant. In one such embodiment the aqueous system is an oilfield system, such as an oilfield production system or an oilfield distribution system. In another such embodiment the aqueous system is a downstream oil-related system, such as an oil refining system.

One group of industrial aqueous systems in which the invention can be used is aqueous systems in topside oilfield locations. Another group of industrial aqueous systems in which the invention can be used is sub-surface applications, e.g. oil wells or gas wells.

In this regard, one benefit of the claimed invention is that the compounds used have good thermal stability. Therefore there is the possibility of using them in high temperature environments, such as within oil wells or gas wells. This option is not available for all known corrosion inhibition systems.

In one preferred embodiment, the present invention is used in relation to an industrial aqueous system selected from oil wells and gas wells.

In one preferred embodiment, the present invention is used in relation to an industrial aqueous system that is a hydrocarbon production system or is used in a production zone in a hydrocarbon system.

In one preferred embodiment, the present invention is used in relation to an industrial oil production well or an industrial gas production well.

In one preferred embodiment, the present invention is used in relation to a production zone of an industrial oil or gas well.

In one embodiment, the aqueous fluid comprises water and further comprises, or will further comprise, dissolved gases, such as carbon dioxide or hydrogen sulphide. The dissolved gases are preferably acidifying gases that can cause corrosion problems.

In one embodiment, the aqueous fluid comprises water and a hydrocarbon, such as oil, and further comprises, or will further comprise, one or more dissolved gases, such as carbon dioxide or hydrogen sulphide. The dissolved gases are preferably acidifying gases that can cause corrosion problems.

The metal component may comprise any metal that is prone to corrode following a time of exposure to an acidic aqueous fluid. It may comprise a metal alloy or a single metal. The metal component may in particular comprise ferrous materials (e.g. steel), copper, and/or aluminium.

In one embodiment the metal component comprises steel, such as mild steel, carbon steel, stainless steel (including precipitation-hardened stainless steel), chrome steel, duplex steel, martensitic alloy steel, ferritic alloy steel, austenitic stainless steel, or high nickel content steel.

The products of the invention (i.e. the alkyl phosphonic acid, or salt or ester thereof, optionally provided in the form of the formulation of the invention) may be applied to the metal component and/or may be added to the aqueous fluid. In one embodiment the product is added to the aqueous fluid.

The products of the invention may be applied to the metal component before the metal component is in contact with the aqueous fluid and/or may be applied once the metal component is in contact with the aqueous fluid.

The products of the invention may be added to the aqueous fluid before the aqueous fluid is in contact with the metal component and/or may be added to the aqueous fluid once the aqueous fluid is in contact with the metal component.

In the present invention, the alkyl phosphonic acid (or salt or ester thereof) may be applied on its own or may be applied together with one or more additional components. These additional components may have been pre-mixed with the alkyl phosphonic acid (or salt or ester thereof), or may be added simultaneously with the alkyl phosphonic acid (or salt or ester thereof), or sequentially with the alkyl phosphonic acid (or salt or ester thereof), or separately from the alkyl phosphonic acid (or salt or ester thereof). They may be added before or after the alkyl phosphonic acid (or salt or ester thereof). When applied separately they may be applied with a time gap between the applications of 10 s or more, such as 30 s or more, or 1 minute or more (such as from 1 to 90 minutes or more), or 5 minutes or more (such as from 5 to 60 minutes or more), or 10 minutes or more (such as from 10 to 30 minutes or more).

The additional components may, for example, be selected from: corrosion inhibitors or surfactants that are not alkyl phosphonic acids (or salts or esters thereof); alkaline materials; solvents; demulsifiers; preservatives; antifoam agents; scale inhibitors; dispersants; biocides; coupling agents; wetting agents; synergists; weighting agents; and binding agents.

Preferred additional components for a liquid formulation may, for example, be selected from: surfactants; alkaline materials; solvents; preservatives; scale inhibitors; wetting agents; and coupling agents.

Preferred additional components for a solid formulation may, for example, be selected from: surfactants; alkaline materials; solvents; preservatives; scale inhibitors; wetting agents; dispersants; binding agents; and weighting agents.

It may be that the alkyl phosphonic acid (or salt or ester thereof) is used in the formulation in an amount of from 0.1 to 80 wt %, e.g. from 0.1 to 60 wt %, such as from 0.5 to 55 wt % or from 1 to 50 wt %.

In one embodiment the alkyl phosphonic acid (or salt or ester thereof) is intended to be present as a major corrosion inhibition component of the formulation.

In that embodiment it may be that the alkyl phosphonic acid (or salt or ester thereof) is used in the formulation in an amount of from 10 to 80 wt %, e.g. from 10 to 60 wt %; for example the amount may be from 20 to 80 wt % or from 20 to 60 wt %, such as from 20 to 55 wt % or from 30 to 50 wt %.

In one embodiment the alkyl phosphonic acid (or salt or ester thereof) is intended to be present as a synergist or component to enhance the corrosion inhibition performance of a primary surfactant system. In that embodiment it may be that the alkyl phosphonic acid (or salt or ester thereof) is used in the formulation in an amount of from 0.1 to 25 wt %, especially from 0.1 to 20 wt % or from 0.1 to 15 wt %; for example the amount may be from 0.5 to 20 wt %, such as from 0.5 to 10 wt % or from 1 to 10 wt %.

The alkyl phosphonic acid or salt or ester thereof may be a surfactant. This is particularly the case where the alkyl group is straight chain. Whether or not the alkyl phosphonic acid or salt or ester thereof is a surfactant, in embodiment of the present invention this compound may be used together with surfactant. Such surfactant will in general hereinafter be referred to as additional surfactant or co-surfactant, but that should not be taken to imply that the alkyl phosphonic acid or salt or ester thereof must necessarily be a surfactant.

In one embodiment the alkyl phosphonic acid (or salt or ester thereof) is applied with co-surfactant. The alkyl phosphonic acid, or salt or ester thereof, and the co-surfactant may be applied simultaneously, sequentially (in either order) or separately (in either order).

In one embodiment, the alkyl phosphonic acid (or salt or ester thereof) and the co-surfactant are applied simultaneously. In that embodiment it may be applied in the form of a formulation according to the present invention.

It may be that the co-surfactant is used in the formulation in an amount of from 0.1 to 60 wt %, such as from 0.5 to 55 wt % or from 1 to 50 wt %. In one embodiment the co-surfactant is used in the formulation in an amount of from 5 to 60 wt %, such as from 8 to 55 wt % or from 10 to 50 wt %.

The co-surfactant used in combination with the alkyl phosphonic acid (or salt or ester thereof), including in the formulations of the invention, may be selected from non-ionic, anionic, cationic and amphoteric surfactants. The co-surfactant may be one that has corrosion inhibition properties, which are enhanced by use in combination with the alkyl phosphonic acid, or the co-surfactant may be one that has no corrosion inhibition properties, with the alkyl phosphonic acid providing the required corrosion protection.

The co-surfactant used in combination with the alkyl phosphonic acid (or salt or ester thereof), including in the formulations of the invention, is preefrably selected from non-ionic, anionic and amphoteric surfactants In one embodiment, the co-surfactant is an amphoteric corrosion inhibitor, such as a surfactant selected from alkylamidopropyl betaines, alkylamidopropyl sultaines, alkyl ampho(di)acetates, and alkyl amphohydroxypropyl sulfonates and propionates, which may be based on lauric acid, coconut oil, palm oil, oleic acid, castor oil, tall oil or ricinoleic acid.

In one embodiment it is a C10-C20 alkylamidopropyl betaine or a C10-C20 alkyl ampho(di)acetate. In one such embodiment it is a C10-C20 alkylamidopropyl betaine, such as castor oil amidopropyl betaine. In another such embodiment it is a C10-C20 alkyl ampho(di)acetate, such as disodium lauramphodiacetate.

In one embodiment it is a propionate, especially a C10-C20 alkyl amphopropionate, C10-C20 alkyl iminopropionates or a propionic acid derivative, e.g. a C10-20 hydroxyethyl or aminoethyl imidazoline. It may be a C10-C18 alkyl amphopropionate, C10-C18 alkyl iminopropionates or a propionic acid derivative, e.g. a C10 -18 hydroxyethyl or aminoethyl imidazoline.

In one embodiment, the co-surfactant is a non-ionic corrosion inhibitor, such as an inhibitor selected from fatty diamine derivatives of oleic or tall oil fatty acids, and fatty acid alkanolamides such as monoisopropyl oleamide.

In one embodiment, the co-surfactant is an anionic corrosion inhibitor, such as an inhibitor selected from acyl sarcosinates, acyl taurides, acyl glutamates, alkyl ether carboxylic acids, alkyl-aryl ether phosphates and alkyl ether phosphates. For example, it may be a C10-C20 acyl sarcosinate, C10-C20 acyl tauride, C10-C20 alkyl ether carboxylic acid, C10-C20 alkyl-aryl ether phosphate or C10-C20 alkyl ether phosphate. These may be ethoxylated and/or propoxylated. In one embodiment it is a C10-C20 acyl taurate. In one embodiment it is a C16/18 alkyl ether carboxylic acid (9 moles EO). In one embodiment it is a C10 ether phosphate ester. In one embodiment it is a C16/18 alkyl phosphate ester (5 moles EO).

In one embodiment, the co-surfactant is a cationic corrosion inhibitor, such as an inhibitor selected from quaternary ammonium salts, such as alkyl trimethyl ammonium halides or benzalkonium derivatives, fatty amines, fatty diamines, amidoamines (including alkylamidopropyl amines and imidazolines or derivatives, e.g. alkoxylates). For example, it may be an alkyl hydroxyethyl or alkyl aminoethyl derivative of oleic or tall oil fatty acids.

In one embodiment, the co-surfactant is a non-ionic corrosion inhibitor, such as an alkyl polyglucoside.

Other co-surfactants that can be mentioned include: alcohol ethoxylates, fatty alcohols, fatty acid ethoxylates, sorbitan esters and polyglyceryl fatty acid esters, as well as alkyl ether sulfates, olefin sulfonates, methyl ester sulfonates, linear alkyl benzene sulfonates, alkyl dimethyl betaines, alkylamidopropyl betaines, alkyl dimethyl hydroxysultaines, alkylamidopropyl hydroxysultaines, amphoacetates, and propionates.

It is preferred that the present invention provides a total amount of surfactant when the product is used in accordance with the invention in a concentration range (total surfactant active agent) of from 10 to 10,000 ppm in the aqueous fluid, e.g. from 10 to 5000 ppm, more preferably from 10 to 1000 ppm, e.g. from 10 to 500 ppm or from 10 to 250 ppm, such as from 10 to 100 ppm. This total amount of surfactant is made up of the amount of any alkyl phosphonic acid or salt or ester thereof that is a surfactant together with the amount of co-surfactant.

It may be that in the present invention the total amount of alkyl phosphonic acid (or salt or ester thereof) provided in accordance with the invention is in a concentration range (total surfactant active agent) of from 0.5 to 10,000 ppm in the aqueous fluid, e.g. from 1 to 5000 ppm, more preferably from 2 to 1000 ppm, e.g. from 4 to 500 ppm or from 5 to 250 ppm, such as from 10 to 100 ppm. In one embodiment, the amount of alkyl phosphonic acid (or salt or ester thereof) is provided to be at a level of from 1 to 2000 ppm in the aqueous fluid to which it is added, e.g. from 2 to 1500 ppm, more preferably from 3 to 1000 ppm, e.g. from 4 to 500 ppm or from 5 to 250 ppm, such as from 5 to 100 ppm.

It may be that in the present invention the total amount of co-surfactant provided in accordance with the invention is in a concentration range (total surfactant active agent) of from 0 to 10,000 ppm in the aqueous fluid. It may of course be that no co-surfactant is used. Where co-surfactant is present, it may provided to be at a level of from 5 to 8000 ppm in the aqueous fluid to which it is added e.g. from 8 to 5000 ppm, more preferably from 10 to 1000 ppm, e.g. from 12 to 500 ppm or from 15 to 250 ppm, such as from 15 to 100 ppm. In one embodiment, the amount is from 5 to 5000 ppm in the aqueous fluid, e.g. from 8 to 3000 ppm, more preferably from 10 to 2000 ppm, e.g. from 10 to 1000 ppm or from 12 to 500 ppm, such as from 15 to 200 ppm.

When both alkyl phosphonic acid (or salt or ester thereof) and co-surfactant are used (whether provided as a formulation or provided separately) it is preferred that the amount of co-surfactant is about the same as or greater than the amount of alkyl phosphonic acid (or salt or ester thereof). The ratio of alkyl phosphonic acid (or salt or ester thereof) to co-surfactant is suitably from 1.5:1 to 1:10 or from 1.5:1 to 1:9, such as from 1.2:1 to 1:10 or from 1.2:1 to 1:9, preferably from 1.1:1 to 1:10 or from 1.1:1 to 1:9, more preferably from 1:1 to 1:10 or from 1:1 to 1:9. For example, it may be from 1:1 to 1:8 or from 1:1 to 1:7, e.g. from 1:2 to 1:6. In some embodiments, it may be about 1:3 or about 1:4 or about 1:5.

In one embodiment, the invention provides the alkyl phosphonic acid (or salt or ester thereof) in a liquid formulation.

One example of a liquid formulation is (with percentages being by weight as a percentage of the total formulation):

| | |
|---|---|
| Alkyl phosphonic acid, e.g. octyl phosphonic acid | 0.5-50% |
| Wetting agent, e.g. di 2-ethylhexyl phosphate ester | 0.5-50% |
| Alkaline material, e.g. KOH or potassium silicate | q.s. |
| Coupling agent, e.g. polyol or glycol ether | 1-40% |
| Scale inhibitor, e.g. polyaspartic acid | 1-5% |
| Preservative | q.s |
| Water | Balance. |

Another example of a liquid formulation is (with percentages being by weight as a percentage of the total formulation):

| | |
|---|---|
| Alkyl phosphonic acid, e.g. octyl phosphonic acid | 0.5-10% |
| Co-surfactant, e.g. lauroyl sarcosine, alkyl polyglucoside | 0.5-50% |
| Alkaline material, e.g. KOH or potassium silicate | q.s. |
| Coupling agent, e.g. polyol and/or glycol ether | 1-40% |
| Scale inhibitor, e.g. polyaspartic acid | 1-5% |
| Preservative | q.s |
| Water | Balance |

Another example of a liquid formulation is (with percentages being by weight as a percentage of the total formulation):

| | |
|---|---|
| Alkyl phosphonic acid, .g. octyl phosphonic acid | 45% |
| Wetting agent, e.g. di 2-ethylhexyl phosphate ester | 45% |
| Alkaline material, e.g. KOH or potassium silicate | 5% |

Another example of a liquid formulation is (with percentages being by weight as a percentage of the total formulation):

| | |
|---|---|
| Alkyl phosphonic acid, e.g. octyl phosphonic acid | 36% |
| Wetting agent, e.g. di 2-ethylhexyl phosphate ester | 36% |
| Alkaline material, e.g. KOH or potassium silicate | 4% |
| Water or other solvent | Balance |

In one optional embodiment the alkyl phosphonic acid (or salt or ester thereof) is applied with alkaline material. In particular, the formulation of the present invention may include any suitable alkaline material to ensure that the formulation is at an alkaline pH. For example, alkaline material may be used that is an alkali metal hydroxide or silicate, such as sodium hydroxide or potassium hydroxide or potassium silicate, and/or it may include an alkali earth metal hydroxide or silicate, such as calcium hydroxide or calcium silicate. Organic bases may also be used, such as monoethanolamine, diethanolamine, triethanolamine and monoisopropylamine.

The alkaline material will be used as required (q.s.). However, it may be that the alkaline material is used in the formulation in an amount of from 0.1 to 15 wt %, such as from 0.5 to 10 wt % or from 1 to 8 wt %.

In one optional embodiment the alkyl phosphonic acid (or salt or ester thereof) is applied with solvent. In particular, the formulation of the present invention may include a solvent as an additional component. The solvent may be aqueous or may be organic. The solvent may be any suitable solvent that is compatible with the aqueous fluid. Examples of solvents include water, dimethyl sulfoxide (DMSO), alkylene glycols, glycol ethers, tetrahydrofuran (THF) and C1-C4 alcohols (e.g. ethanol).

In general, the solvent will be used to make up the balance to 100% for the formulation. In some embodiments there is no solvent used. It may be that the solvent is used in the formulation in an amount of from 1 to 95 wt %, such as from 5 to 90 wt % or from 10 to 85 wt %.

In one optional embodiment the alkyl phosphonic acid (or salt or ester thereof) is applied with demulsifier. In particular, the formulation of the present invention may include a demulsifier as an additional component. Examples of demulsifers include alkyl phenol-formaldehyde resins; polyamine alcoxylates; di-epoxides alcoxylates; and polyols, e.g. PEG alcoxylates, polyglycerol alcoxylates or glycerol alcoxylates.

It may be that demulsifier is not used. When demulsifier is present in the formulation it may be in an amount of from 0.1 to 10 wt %, such as from 0.5 to 5 wt % or from 1 to 3 wt %.

In one optional embodiment the alkyl phosphonic acid (or salt or ester thereof) is applied with scale inhibitor. In particular, the formulation of the present invention may include scale inhibitor as an additional component. The scale inhibitor may, for example, be selected from polyacrylates and/or copolymers of polyacrylates and vinyl phosphonic acid (VPA) or vinylidene-1,1 diphosphonic acid (VDPA) and/or polyacrylates terminated with VPA or VDPA; polymaleates; polyaspartates; polysulfonates; phosphonates; and bisphosphonates. In one embodiment the scale inhibitor is polyaspartic acid or a salt thereof.

It may be that the scale inhibitor is used in the formulation in an amount of from 0.1 to 10 wt %, such as from 0.5 to 8 wt % or from 1 to 5 wt %. However, it will be appreciated that scale inhibitor is not essential and in some embodiments it will not be present.

In one optional embodiment the alkyl phosphonic acid (or salt or ester thereof) is applied with biocide. In particular, the formulation of the present invention may include biocide as an additional component. The biocide may, for example, be a quaternary ammonium or phosphonium compound, such as an ADBAC quaternary ammonium compound, or a tetrakis (hydroxymethyl) phosphonium salt, or formaldehyde glutaraldehyde.

It may be that the biocide is used in the formulation in an amount of from 0.1 to 10 wt %, such as from 0.5 to 8 wt % or from 1 to 5 wt %. However, it will be appreciated that biocide is not essential and in some embodiments it will not be present.

In one optional embodiment the alkyl phosphonic acid (or salt or ester thereof) is applied with coupling agent. In particular, the formulation of the present invention may include coupling agent as an additional component. The coupling agent may, for example, be selected from polyols and glycol ethers. Examples of glycol ether coupling agents include, but are not limited to, short-chain alkyl (e.g. C1-C6) ethers of ethylene glycol, propylene glycol, or butylene glycol, phenolic ethers of ethylene glycol, propylene glycol, or butylene glycol. In one embodiment the coupling agent is ethylene glycol, ethylene glycol monobutyl ether or the like.

It may be that the coupling agent is used in the formulation in an amount of from 0.5 to 40 wt %, or from 1 to 40 wt %, such as from 1 to 35 wt % or from 5 to 30 wt %.

In one optional embodiment the alkyl phosphonic acid (or salt or ester thereof) is applied with dispersant. In particular, the formulation of the present invention may include dispersant as an additional component. The dispersant may, for example, be a polymeric surfactant. A dispersant may in particular be used when the alkyl phosphonic acid (or salt or ester thereof) is provided as a solid product.

It may be that the dispersant is selected from the group consisting of: hyper branched polymers (e.g. Hypermer range ex Croda Chemicals), poly fatty acid esters, ethylene oxide block copolymers of poly fatty acid, polymers based on polyisobutylene succinic anhydride, and mixtures thereof. The dispersant may also be selected from polymers commonly used in agrochemical formulations, e.g. Tersperse (ex Huntsman). Examples include naphthalene sulfonate formaldehyde condensates, acrylic graft copolymers, polyester condensates and amine condensates.

Examples of dispersants that can be used include hyper branched polymers such as 'Hypermers' or Atlox® from Croda or Agrimer range from ISP (e.g. Hypermer®PS1, Hypermer®PS2, Hypermer®PS3, Hypermer®A60 (polyester non-ionic surfactant, MW~15000), Hypermer®B246 (block copolymer of PFA (poly 12-hydroxystearic acid) and ethylene oxide (EO) with a MW of about 7500), Hypermer®B261 (block copolymer of PFA and EO with a MW of about 9600), Atlox®LP1 (anionic polymeric surfactant), Atlox®LP2, Atlox®LP4, Atlox®LP5, Atlox®LP6, and Atlox®4912.

Other examples of dispersants that can be used include poly fatty acid (PFA) esters such as those based on polyhydroxystearic acid, e.g. Hypermer®LP1 (polymer backbone based on 12-hydroxystearic acid with a d.p.~9). EO block copolymers of PFA (e.g. Hypermer® B261, HLB~8, mw~9600) can also be used. Polymers based on polyisobutylene succinic anhydride, e.g. PIBSA derivatives ('Anfomul' series ex Croda Chemicals or Lubrizol ranges, e.g. Lubrizol 2600 and 8065) may also be used as the dispersant system.

According to one embodiment, the solid formulation of the present invention comprises a dispersant chosen from: poly-hydroxystearic acid esters, and EO/PO block copolymers of poly fatty acid. PEG diesters can also be considered for use. Preferably, said dispersant is Hypermer®LP1 or Hypermer® B261.

It may be that the dispersant is used in the formulation in an amount of from 0.1 to 15 wt %, such as from 0.5 to 12 wt % or from 1 to 10 wt % or from 1 to 5 wt %. If the formulation is liquid it may be that there is no dispersant present.

In one optional embodiment the alkyl phosphonic acid (or salt or ester thereof) is applied with synergist. In particular, the formulation of the present invention may include synergist as an additional component. The synergist may, for example, be selected from zinc salts such as zinc chloride or zinc acetate.

It may be that the synergist is used in the formulation in an amount of from 0.1 to 10 wt %, such as from 0.5 to 8 wt % or from 1 to 5 wt %. However, in some embodiments a synergist is not used.

In one optional embodiment the alkyl phosphonic acid (or salt or ester thereof) is provided in the form of a solid product and in this regard the solid product includes binding agent binder as an additional component. The binding agent may, for example, be selected from C16-C24 fatty alcohols, C16-C24 fatty alcohol ethoxylates, fatty acid alkanolamides, fatty acids, natural waxes and resins (e.g. vegetable wax), high molecular weight polyethylene glycols, polyethylene waxes, mineral and petrolatum waxes, microcrystalline waxes, and mixtures thereof.

It may be that the binding agent is used in the formulation in an amount of from 0.1 to 60 wt %, such as from 0.5 to 55 wt % or from 1 to 50 wt % or from 5 to 40 wt %.

When C16-C24 fatty alcohol ethoxylates are used, the degree of ethoxylation may, for example, be from 20 to 50 moles. Therefore examples of such binder products include cetyl 20 to 50 mole ethoxyate and oleyl 20 to 50 mole ethoxyate. According to one embodiment, the binding agent may comprise a mixture of polyethylene glycol and fatty alcohol ethoxylate. In such an embodiment, the ethoxylates may be added to the polyethylene glycol wax to control the dissolution rate of the solid. According to one embodiment, the binding agent may comprise a mixture of vegetable wax and fatty alcohol ethoxylate. According to one embodiment, the binding agent may comprise a mixture of polyethylene glycol, vegetable wax and fatty alcohol ethoxylate.

The fatty acid alkanolamides may include C12-C36 fatty acids reacted with C1-C8 alkanolamines, e.g. C1-C6 alkanolamines. As non limiting examples of fatty acid alkanolamides that can suitably be used, C12-C36 fatty acids reacted with monoethanolamine or monoisopropylamine can be mentioned. Suitable alkanolamides include MACK-AMIDE LMA ex Solvay.

When the binding agent is chosen from fatty acids, these may, for example, include natural soap bases (alkali metal salts). Examples include soaps derived from palm oil, coconut oil, rapeseed (erucic acid), castor oil and olive oil.

As natural waxes and resins, montan wax (lignite) is preferred. Waxes include hydrogenated castor oil, candelilla, beeswax, carnauba, rice bran, palm, soy and rapeseed. Materials are available with a range of melting points, preferably in the temperature range of from 60 to 100° C.

According to one embodiment, the binding agent is chosen from high molecular weight polyethylene glycols. In particular, these polyethylene glycols may be chosen from PEG 1500, PEG 3000, PEG 4000 or PEG 6000, e.g. Pluriol E series, ex BASF or Carbowax®, ex Dow Chemicals. The melting point and mechanical strength imparted by the glycol can be further manipulated by the inclusion of lower molecular weight polymers, e.g. PEG 200 to 1000. The inclusion of the lower molecular weight homologues lowers the melting point of the formulation and therefore aids its dissolution/disintegration in the aqueous fluid.

As mineral and petrolatum waxes, ozokerite and ceresine may be stated as suitable examples.

In one embodiment, the binding agent is chosen from the group consisting of fatty acid alkanolamides, C16-C24 fatty alcohol ethoxylates, high molecular weight polyethylene glycols, natural waxes and resins (in particular vegetable waxes) and mixtures thereof. In one embodiment, the binding agent comprises one or more C16-C24 fatty alcohol ethoxylate and may optionally further comprise one or more additional binders chosen from the group consisting of fatty acid alkanolamides, high molecular weight polyethylene glycols (such as PEG 1500 or PEG 4000 or PEG 6000), natural waxes and resins (in particular vegetable waxes) and mixtures thereof.

According to one embodiment, the binding agent comprises a fatty acid alkanolamide, such as lauric monoethanolamide, and/or a high molecular weight polyethylene glycol, such as PEG 1500, PEG 4000 or PEG 6000.

In one preferred embodiment, the formulation of the invention comprises a fatty acid alkanolamide, such as lauric monoethanolamide, and/or a C16-C24 fatty alcohol ethoxylate and may also comprise a high molecular weight polyethylene glycol and/or a natural wax, such as vegetable wax, in particular rapeseed wax.

According to one advantageous embodiment, the formulation of the invention comprises a fatty acid alkanolamide and/or a C16-C24 fatty alcohol ethoxylate as a binding agent, in particular in a total amount of from 1 to 40 wt %, such as from 5 to 30 wt %. The formulation of the present invention may also comprise a further binding agent, in particular chosen from vegetable waxes and high molecular weight polyethylene glycols. These further agents may in particular be included in a total amount of from 1 to 40 wt %, such as from 5 to 30 wt %.

In one optional embodiment the alkyl phosphonic acid (or salt or ester thereof) is provided in the form of a solid product and in this regard the solid product includes weighting agent. In particular, the formulation of the present invention may include weighting agent as an additional component. The weighting agent may, for example, be selected from the group consisting of: barium sulphate, calcium carbonate, dolomite, water-soluble salts of alkali metals, such as sodium chloride, potassium chloride, potassium carbonate, sodium carbonate, potassium sulphate, sodium sulphate, sodium citrate and potassium citrate, and mixtures thereof.

The weighting agent is used to increase the density. The specific gravities of the aqueous fluids in which the invention is to be used are typically greater than 1.0. The purpose of the weighting agent is to ensure the formulation is fully immersed in the aurous fluid to permit intimate contact and allow it to quickly dissolve. Weighting agents commonly used in drilling fluids may be included in the formulation as finely divided powders. Examples include barium sulphate (barite), calcium carbonates (crushed marble) and dolomites. Water soluble salts of alkali metals are also preferred because they improve the dissolution rate, e.g. sodium chloride, potassium chloride, potassium carbonate, sodium carbonate, sodium sulphate, sodium citrate and potassium citrate.

It may be that the weighting agent is used in the formulation in an amount of from 0.1 to 40 wt %, such as from 0.5 to 35 wt % or from 1 to 30 wt %. Preferably the amount used is from 0.5 to 20 wt %, such as from 1 to 20 wt % or from 5 to 20 wt %.

In one embodiment, the invention provides the alkyl phosphonic acid (or salt or ester thereof) in a solid formulation.

One example of a solid formulation is (with percentages being by weight as a percentage of the total formulation):

| | |
|---|---|
| Alkyl phosphonic acid e.g. octyl phosphonic acid or lauryl phosphonic acid | 1-50% |
| Wetting agent, e.g. Lecithin | 1-10% |
| Co-surfactant, e.g. alpha olefin sulfonate | 1-50% |
| Dispersant, e.g. hyperbranched polymer | 1-10% |

-continued

| | |
|---|---|
| Binder, e.g. Cetyl/Oleyl alcohol plus 50 moles EO | 1-40% |
| Binder, e.g. vegetable wax, polyethylene glycol | 1-40% |
| Weighting agent, e.g. sodium sulfate or barite | 1-30% |
| Scale inhibitor, e.g. sodium polyaspartate | 1-5% |
| Neutralising agent, e.g. potassium silicate | q.s. |

In one embodiment, when the product is provided in solid form, it is provided in accordance with the solid formulations disclosed in EP 2589639A.

The products of the invention may suitably be used to inhibit corrosion of a metal component in an industrial hydrocarbon system; this may be a plant for exploration, recovery, refining or distribution of hydrocarbon. For example, it may be an oil or gas plant. In one such embodiment the system is an oilfield system, such as an oilfield production system or an oilfield distribution system. In another such embodiment the aqueous system is a downstream oil-related system, such as an oil refining system.

Preferred industrial systems may be aqueous systems in topside oilfield locations and aqueous systems in subsurface locations, e.g. oil wells and gas wells.

In one embodiment, the invention prevents or reduces corrosion of metal surfaces used during the recovery, transportation and/or refining of hydrocarbon, by corrosive substances selected from water with high salt contents (e.g. brine), acidic inorganic compounds (such as carbon dioxide or hydrogen sulfide) and natural organic acids.

In a most preferred embodiment, the invention prevents or reduces corrosion of metal surfaces in hydrocarbon production wells, by corrosive substances selected from water containing dissolved acidic gases (such as carbon dioxide or hydrogen sulfide).

EXAMPLES

The invention will now be further described, in a non limiting manner, with reference to the following examples.

Example 1

The corrosion inhibition performance of octylphosphonic acid was evaluated under oilfield conditions using the bubble test. Further tests were carried out in a Rotating Cylinder Electrode (RCE) system, which better simulates the high shear rates encountered in oilfield production systems.

The octylphosphonic acid samples and blends evaluated are outlined in the table below:

| Sample | Composition | Test method used | Concentration |
|---|---|---|---|
| 1 | 50:50 water & Duraphos 2-EHAP | Bubble test only | 20 ppm product |
| 2 | 50:50 Octyl Phosphonic Acid (100%) and Duraphos 2-EHAP | Bubble test and RCE | 20 ppm product and 21 ppm actives |
| 3 | Octyl Phosphonic Acid (80%) | RCE only | 20 ppm actives |

Initial Bubble Test Screening

A bubble test was carried out as follows:

Clean corrosion cells were fitted with a stirring bar, auxiliary electrode, reference electrode, gas sparge tube, and glass periscope.

Each cell was charged with 999 g of the desired corrosion fluid. In this instance a 5% NaCl brine and Isopar M oil phase was used in a 9:1 ratio.

The cells were placed in a water bath set at 60° C. and set to stir at approximately 300 rpm.

Each cell was connected to a constant sparge of $CO_2$ approx. 60 $cm^3$/min and then left for 1 hour to reach equilibrium.

C1018 mild steel coupons were washed with xylene and acetone to remove any vapour phase corrosion inhibitor and allowed to dry.

After the cells reached equilibrium the mild steel coupons were connected to the working electrodes and inserted into each cell using the glass periscopes to avoid getting the electrodes oil wet.

The LPR run was started and baseline corrosion data was collected for approximately 2.5 hours.

During this time 2% (w/w product) stock solutions of samples 1&2 were made up in deionised water. It should be noted that as samples 1&2 were water insoluble the stock solutions were injected as emulsions.

After the baseline corrosion data was collected the stock solutions were injected into the cells at a concentration of 20 ppm (w/w product).

The corrosion rate in each cell was recorded for at least a further 12.5 hours.

| Condition | Description |
|---|---|
| Brine | 5% NaCl |
| Oil phase | Isopar M (C11-C15 iso-paraffins) |
| Brine Oil Ratio | 9:1 |
| Temperature | 60° C. |
| Gas Sparge | Constant $CO_2$ |
| Stirring speed | ~300 rpm |
| Working electrode | Mild Steel C1018 |
| Reference electrode | Ag/AgCl (saturated in KCl) |
| Auxiliary electrode | Platinum |
| Inhibitor Concentration | 20 ppm (product) |
| Test period | 15+ hours |

The skilled reader will appreciate that the bubble test can only be used to evaluate if a product acts as a corrosion inhibitor and to rank corrosion inhibitors in order of effectiveness. It cannot be used to determine absolute corrosion rates expected in the field—and though it monitors general corrosion rates it is not as effective at detecting or monitoring pitting corrosion.

The results are shown in the table below.

| Composition of Sample | Concentration | Efficiency at T = 15 | Average corrosion rate (Weight Loss) | Average corrosion rate (Bubble Test) |
|---|---|---|---|---|
| (50:50) blend of (a) Water & (b) Duraphos 2-EHAP | 20 ppm product | 0% | 194 mils/y | 205 mils/y |
| (50:50) blend of (a) Octyl phosphonic acid (100%) & (b) Duraphos 2-EHAP | 20 ppm product | 93% | 67 mils/y | 48 mils/y |

It can be seen that the use of octylphosphonic acid (blended with ethylhexyl acid phosphate as wetting agent) gives significant corrosion protection.

Rotating Cylinder Electrode (RCE) Film Persistency Test (1500 rpm)

An RCE film persistency test was carried out as follows:
A clean jacketed RCE corrosion cell was fitted with an auxiliary electrode, reference electrode, and gas sparge tube.
The cell was charged with 899.1 g of 5% NaCl brine.
The temperature of the circulator connected to the jacketed cell was set to 60° C.
A constant $CO_2$ sparge of approx. 200 $cm^3$/min was passed through the brine in the RCE cell which was then left for 1 hour to reach equilibrium.
A C1018 mild steel coupon was washed in xylene and acetone to remove any vapour phase corrosion inhibitor and allowed to dry.
After the RCE cell reached equilibrium the mild steel coupon was connected to the RCE shaft and inserted into the RCE cell.
Isopar M 99.9 g was then carefully transferred into the cell so that it floated on top of the brine. (This is done at this stage to prevent the working electrode from becoming oil wet as a periscope is unavailable)
The rotator was turned on and set to 1500 rpm.
Baseline corrosion data was collected for approximately 2.5 hours.
During this time 2% (w/w active) stock solutions of samples 2 or 3 were made up in methanol. It should be noted that samples 2&3 were fully soluble in methanol and therefore the stock solutions were injected as homogenous solutions.
After the baseline corrosion data was collected the stock solution under evaluation was injected into the RCE cell at a concentration of 20 or 21 ppm (w/w active).
The corrosion rate in the cell was recorded for at least a further 12.5 hours.

| Condition | Description |
| --- | --- |
| Brine | 5% NaCl |
| Oil phase | Isopar M (C11-C15 iso-paraffins) |
| Brine Oil Ratio | 9:1 |
| Temperature | 60° C. |
| Gas Sparge | Constant $CO_2$ |
| Stirring speed | 1500 rpm |
| Working electrode | Mild Steel C1018 |
| Reference electrode | Ag/AgCl (saturated in KCl) |
| Auxiliary electrode | Platinum |
| Inhibitor Concentration | 20 ppm & 21 ppm (active) |
| Test period | 15+ hours |

The results are shown in the table below.

| Composition | Concentration | Efficiency at T = 15 | Average corrosion rate (Weight Loss) | Average corrosion rate (RCE Test) |
| --- | --- | --- | --- | --- |
| (50:50) blend of (a) Octyl Phosphonic Acid (100%) & (b) Duraphos 2-EHAP | 21 ppm active | 90% | 81 mils/y | 70 mils/y |
| Octyl Phosphonic Acid (80%) | 20 ppm active | 96% | 56 mils/y | 61 mils/y |

It can be seen that the use of octylphosphonic acid (blended with ethylhexyl acid phosphate as wetting agent) gives significant corrosion protection.

Rotating Cylinder Electrode (RCE) Film Persistency Test (4000 rpm)

An RCE film persistency test was carried out as follows:
A clean jacketed RCE corrosion cell was fitted with an, auxiliary electrode, reference electrode, and gas sparge tube.
The cell was charged with 899.1 g of 5% NaCl brine.
The temperature of the circulator connected to the jacketed cell was set to 60° C.
A constant $CO_2$ sparge of approx. 200 $cm^3$/min was passed through the brine in the RCE cell which was then left for 1 hour to reach equilibrium.
A C1018 mild steel coupon was washed in xylene and acetone to remove any vapour phase corrosion inhibitor and allowed to dry.
After the RCE cell reached equilibrium the mild steel coupon was connected to the RCE shaft and inserted into the RCE cell.
Isopar M 99.9 g was then carefully transferred into the cell so that it floated on top of the brine. (This is done at this stage to prevent the working electrode from becoming oil wet as a periscope is unavailable)
The rotator was turned on and set to 4000 rpm. (NB. This is the fastest speed achievable using current available equipment.)
Baseline corrosion data was collected for approximately 2.5 hours.
During this time a 2% (w/w active) stock solution of Rhodafac ASI 80 was made up in methanol.
After the baseline corrosion data was collected the stock solution was injected into the RCE cell at a concentration of 20 ppm (w/w active).
The corrosion rate in the cell was recorded for at least a further 12.5 hours.

| Condition | Description |
| --- | --- |
| Brine | 5% NaCl |
| Oil phase | Isopar M (C11-C15 iso-paraffins) |
| Brine Oil Ratio | 9:1 |
| Temperature | 60° C. |
| Gas Sparge | Constant $CO_2$ |
| Stirring speed | 4000 rpm |
| Working electrode | Mild Steel C1018 |
| Reference electrode | Ag/AgCl (saturated in KCl) |
| Auxiliary electrode | Platinum |
| Inhibitor Concentration | 20 ppm & 21 ppm (active) |
| Test period | 15+ hours |

The results are shown in the table below.

| Compostition | Concentration | Test | Effciency at T = 15 | Average corrosion rate (Weight Loss) | Average corrosion rate (RCE test) |
| --- | --- | --- | --- | --- | --- |
| Octyl Phosphonic Acid (80%) | 20 ppm active | 1500 rpm | 96% | 56 mils/y | 61 mils/y |
| Octyl Phosphonic Acid (80%) | 20 ppm active | 4000 rpm | 93% | 56 mils/y | 89 mils/y |

The results of the RCE tests indicate the surfactant continues to provide adequate protection against corrosion when the shear rate is increased from 1500 rpm to 4000 rpm.

Conclusion

Under the test conditions used a (50:50) blend of octylphosphonic acid with ethylhexyl acid phosphate has a significant effect upon corrosion, with greater than 90% corrosion inhibition achieved. It also shows that the ethylhexyl acid phosphate on its own has no corrosion inhibition properties.

20 ppm octylphosphonic acid is sufficient to provide greater than 90% corrosion inhibition under the RCE conditions used.

Increasing the rotation speed of the RCE from 1500 rpm to 4000 rpm has little effect upon the final corrosion rate obtained in the system after inhibitor injection; the octylphosphonic acid maintained an efficiency of >90% at both 1500 rpm and 4000 rpm. The shear rate of 4000 rpm was used to simulate very high shear conditions and the good results show the film persistence properties of the surfactants.

Example 2

The corrosion inhibition performance of octylphosphonic acid and laurylphosphonic acid was tested, in formulations that include co-surfactant.

In this regard, LPR and static immersion corrosion tests were carried out to demonstrate efficacy of octyl phosphonic acid and lauryl phosphonic acid in oilfield corrosion inhibitor applications.

Model formulations as tested contained co-surfactants known to be corrosion inhibitors together with octyl phosphonic acid (80%).

C1018 coupons were immersed in the model formulations containing the surfactants over a specified pH range to determine whether the addition of the octyl phosphonic acid could reduce pitting.
Co-surfactants Tested
  A) MACKTERRA V4092/MB (32% active)—Castor amidopropyl betaine
  B) MIRANOL ULTRA L-32E (32% active)—Disodium Lauramphodiacetate
  C) MIRANOL ULTRA L-99 (28% active)—Disodium Lauramphodiacetate**
  D) GEROPON HW15 (100% active)—Alkyl ether carboxylic acid (C16/18+9EO)
  E) GEROPON T77 (77% active powder)—Sodium Oleyl N-methyl Taurate
  F) RHODAFAC RA 600/E (100%active)—C10 ether phosphate ester
  G) RHODAFAC PA 35 (100% active)—C16/18 EO 5 phosphate ester ** Surfactant has high MCM/DCM ratio (~99%). MCM is the monocarboxymethylate surfactant and DCM refers to the dicarboxymethylated surfactant. The high MCM/DCM ratio surfactant has been observed to have an improved CI performance compared to MIRANOL ULTRA L-32E.
  ARMOHIB CI-219 (100% active)—Tall oil aminoethyl imidazoline used to bench mark corrosion inhibitor performance (LPR/RCE)
  FENTACARE 1021-80 (80% active)—Didecyldimethylamonium chloride
Alkyl Phosphonic Acids (ex Solvay) Tested
  Octyl Phosphonic Acid (80% active)
  Lauryl Phosphonic Acid (100% active)
  Phosphate esters blended with alkyl phosphonic acids to determine any synergistic properties.
Formulations Tested
  20% active formulations comprising different ratios of amphoteric surfactant were tested. In each case the pH of the base formulation was adjusted to 8.5-9.5 with KOH (50%) to neutralise the acid surfactants.

Surfactant ratios used were 80/20, 60/40, 50/50, 40/60 and 20/80 respectively. Individual surfactants (i.e. 100/0 or 0/100) were also tested.

The formulations containing GERAPON HW15 and GEROPON T77 respectively were 10% active because these surfactants can form viscous gels when dispersed in water. The surfactant ratios and the pH are the same as those used for the amphoteric surfactants. 10% active formulations of the amphoteric surfactants were also prepared for the immersion corrosion tests, for comparative purposes.

a) Formulations with 10% a.i. Surfactant (Per 100 g of Sample)

| Component | Surfactant ratio (Surfactant CI/Octyl Phosphonic Acid) | | | | | | |
|---|---|---|---|---|---|---|---|
| | 100 | 80/20 | 60/40 | 50/50 | 40/60 | 20/80 | 0 |
| Octyl Phosphonic Acid (80%) | — | 2.5 | 5.0 | 6.3 | 7.5 | 10.0 | 12.5 |
| Surfactant E (77%) | 13.0 | 10.4 | 7.8 | 6.5 | 5.2 | 2.6 | — |
| EGMBE (100%) | 10.0 | 10.0 | 10.0 | 10.0 | 10.0 | 10.0 | 10.0 |
| Monoethylene Glycol (100%) | 20.0 | 20.0 | 20.0 | 20.0 | 20.0 | 20.0 | 20.0 |
| KOH (50% aq) | q.s | q.s | q.s | q.s | q.s | q.s | q.s |
| Water | 57 | 57.1 | 57.2 | 57.2 | 57.3 | 57.4 | 57.5 | pH (100%) = 8.0-9.0 b) Formulations with 20% a.i. Surfactant (Per 100 g of Sample)

| Component | Surfactant ratio (Surfactant CI/RHODAFAC ASI-100) | | | | | | |
|---|---|---|---|---|---|---|---|
| | 100 | 80/20 | 60/40 | 50/50 | 40/60 | 20/80 | 0 |
| Octyl Phosphonic Acid (80%) | — | 5.0 | 10.0 | 12.6 | 15.0 | 20.0 | 25.0 |
| Surfactant A (32%) | 62.5 | 50.0 | 37.5 | 31.3 | 25.0 | 12.5 | — |
| EGMBE (100%) | 10.0 | 10.0 | 10.0 | 10.0 | 10.0 | 10.0 | 10.0 |
| Monoethylene Glycol (100%) | 20.0 | 20.0 | 20.0 | 20.0 | 20.0 | 20.0 | 20.0 |
| KOH (50% aq) | q.s | q.s | q.s | q.s | q.s | q.s | q.s |
| Water | 7.5 | 15.0 | 22.5 | 26.1 | 30.0 | 37.5 | 45.0 | pH (100%) = 8.0-9.0

Corrosion Tests
The following methods were used to investigate the performance attributes of the alkyl phosphonic acids.
LPR/RCE Measurements Corrosion inhibition properties were screened using the LPR (Linear Polarisation Resistance) bubble test method and the film persistence of the surfactants was evaluated using a Rotating Cylinder Electrode (RCE). The conditions were the same in both tests.

A 90/10 brine (5% w/w NaCl) and Isopar M (C9-15 iso-paraffins) mixture at 60° C. was saturated with $CO_2$. The electrodes were immersed in the brine and left for several hours to establish the base line corrosion rate before injecting the surfactant. The surfactant inhibitors were injected at a concentration of 20 ppm (active) unless specified.

The RCE measurements were also performed on surfactants which produced corrosion inhibition efficiencies greater than 90% (after 15 hours). A shear rate of 4000 rpm was used to simulate very high shear conditions in order to determine the film persistence properties of the surfactants. Shear rates used for standard RCE tests are typically of the order of 2000 rpm ($21\ s^{-1}$).

The corrosion rate at 15 hours was used to benchmark the efficacy of the formulations containing octyl phosphonic acid against a commercial corrosion inhibitor. Synergistic properties of the surfactant mixtures were identified by comparing them against the corrosion rates of the individual surfactants.

In general, standard LPR/RCE test conditions were used for the investigation.

The surfactant ratios for the LPR/RCE measurements were 80/20 and 50/50 Cl/octyl phosphonic acid and compared against the individual surfactants. The tests were therefore performed on surfactant combinations that demonstrated synergistic benefits.

The performance was also compared against a standard corrosion inhibitor (ARMOHIB CI-219 ex Akzo Nobel).

LPR tests were carried out to determine the effect of increasing the octyl phosphonic acid content on the corrosion rates.

Immersion Corrosion Tests

Immersion corrosion tests were carried out at 40° C. in standard SMOW and NACE brines. The brines were inhibited with 1000 ppm active surfactant. Carbon steel (C1018) coupons were immersed in the brine and stored at 40° C. The coupons had dimensions 50×25×1.6 mm and were supplied by European Corrosion Supplies Limited. Prior to use, the coupons were washed with de-ionised water and weighed.

The weight loss was determined by weighing the coupons and compared against the brine alone (blank) at 1 day, 3 days, 7 days and 28 days respectively. The coupons were washed with acetone and water at the end of the test to remove any residues or corrosion deposits.

The coupons were then oven dried before re-weighing with the average weight change of the duplicate coupons being used to calculate the corrosion rate.

The brines had the following compositions:

NACE Brine

| Component | g/L |
| --- | --- |
| NaCl | 94 |
| $CaCl_2 \cdot 2H_2O$ | 4.07 |
| $MgCl_2 \cdot 6H_2O$ | 1.86 |
| Water | Balance |

SMOW Formulation

| Component | g/L |
| --- | --- |
| NaCl | 24.53 |
| KCl | 0.7 |
| KBr | 0.1 |
| $CaCl_2 \cdot 2H_2O$ | 1.54 |
| $MgCl_2 \cdot 6H_2O$ | 11.1 |
| $Na2SO_4$ | 4.09 |
| $NaHCO_3$ | 0.2 |
| Water | Balance |

The pH was adjusted to 8.2 with 0.1N NaOH

Foam Tendency

Foam tendencies were investigated using the methods described in ASTM G170-06 (2012) 'Standard Guide for Evaluating and Qualifying Oilfield and Refinery Corrosion Inhibitors in the Laboratory'.

It will be appreciated that, in general, corrosion inhibition formulations which produce low foam volumes are preferred.

A graduated dynamic foam test apparatus (1000 ml measuring cylinder) fitted with a No. 1 porosity gas sparge tube was used for the test. 1000 ppm of corrosion inhibitor was added to a 50/50 v/v brine (5% NaCl solution) and Isopar M mixture (200 ml) at ambient temperature (25° C.). The mixture was left for 10 minutes before immersing the sparge tube in the brine layer. Nitrogen gas (flow rate: 0.5 litre/min) was injected into the solution and the volume of foam produced was measured over a set period of time (10 minutes).

If the foam reached the 1000 ml mark (800 ml foam volume) before the 10 minutes had elapsed then the time taken for the foam to reach the 1000 ml mark (800 ml of foam) was recorded. The volume of foam produced after the allotted time was also recorded.

The foam persistence was determined by measuring the foam volume after 10 minutes.

Emulsion Tendency

The emulsification behaviours of the alkyl phosphonic acids were investigated using the standard test procedure, ASTM G-170. It will be appreciated that, in general, corrosion inhibition formulations which have a low tendency to form emulsions with hydrocarbons are preferred.

1000 ppm active corrosion inhibitor formulation was added to a 250 ml measuring cylinder containing 100 ml 50/50 v/v 5% NaCl and Isopar M respectively. The cylinder was sealed and shaken 100 times.

The mixture was allowed to rest and the emulsion and brine layer volumes were recorded. The brine, Isopar M and emulsion layers were measured at 5, 10 and 30 minutes respectively.

Model Formulations

The corrosion inhibition properties of the alkyl phosphonic acids were assessed in foamer formulations. The base formulations were prepared with neutralised alkyl phosphonic acid (100% active)—either octyl phosphonic acid (OPA) or lauryl phosphonic acid (LPA)—and the foamer surfactant in an aqueous mixture of 2:1 ethylene glycol and EGMBE (ethylene glycol mono n-butyl ether). The pH was adjusted to give an alkaline solution.

The foamer surfactants used for the study are given in the following table.

| Foamer Surfactant | Product | Chemistry | Active (%) |
| --- | --- | --- | --- |
| I | MACKAM LSB-50 ex Solvay | Lauramidopropyl Hydroxysultaine | 40 |
| II | MIRANOL ULTRA L32E ex Solvay | Disodium Lauramphodiacetate | 32 |

| | Surfactant ratio (Foamer/alkyl phosphonic acid) | | | | | | |
| --- | --- | --- | --- | --- | --- | --- | --- |
| Component | 100/0 | 80/20 | 60/40 | 50/50 | 40/60 | 20/80 | 0/100 |
| APA (100% active) | — | 2.0 | 4.0 | 5.0 | 6.0 | 8.0 | 10.0 |
| Foamer Surfactant (I or II) (40%) | 25 | 20 | 15.0 | 12.5 | 10.0 | 5.0 | 0 |
| EGMBE (100%) | 10.0 | 10.0 | 10.0 | 10.0 | 10.0 | 10.0 | 10.0 |
| Monoethylene Glycol (100%) | 20.0 | 20.0 | 20.0 | 20.0 | 20.0 | 20.0 | 20.0 |
| KOH (50% aq) | q.s | q.s | q.s | q.s | q.s | q.s | q.s |
| Water | Bal | Bal | Bal | Bal | Bal | Bal | Bal | pH (100%): 8.0-9.0
APA = alkyl phosphonic acid (either octyl phosphonic acid or lauryl phosphonic acid)
Bal = balance (to 100%)
qs = as required (quantum sufficit)

Results

Bubble Test Results

Linear Polarisation Resistance measurements were obtained for the individual surfactants and blends with the alkyl phosphonic acids.

The results are given in the following table for the individual surfactants, and surfactant mixtures, at a fixed concentration of 20 ppm unless specified.

| Component | Concentration | Effciency at T = 15 (%) | Average corrosion rate [weight loss] (mils/y) | Average corrosion rate [bubble test] (mils/y) |
|---|---|---|---|---|
| Fentacare D1021-80 | 20 ppm | 90.5 | 80.3 | 75.6 |
| 80/20 Miranol Ultra L32E/Fentacare 1021-80 & 2% sodium thiosulfate** | 20 ppm | 99.6 | 40.32 | 27.5 |
| Tall Oil Aminoethyl Imidazoline | 20 ppm | 98.3% | 48.3 | 50.9 |
| OPA (80%) | 20 ppm | 96.3 | 48.1 | 49.1 |
| OPA (80%) | 4 ppm | 0 | 244.3 | 267.4 |
| Miranate LEC-80 | 20 ppm | 74.1 | 100.8 | 88.6 |
| 80/20 LEC-80/OPA | 20 ppm | 94.5 | 46.6 | 43.9 |
| Mackam LSB-50 | 20 ppm | 0 | 211.7 | 223.1 |
| 80/20 LSB-50/OPA | 20 ppm | 96.8 | 46.4 | 42.7 |
| Mackterra V4092-MB | 20 ppm | 95.9 | 56.5 | 42.7 |
| 80/20 V4092-MB/OPA | 20 ppm | 97.6 | 56.9 | 38.5 |
| Geropon HW 15 | 20 ppm | 89.2 | 68.2 | 62.7 |
| 80/20 HW15/OPA | 20 ppm | 94.1 | 51.1 | 43.1 |
| Miranol Ultra L32E | 20 ppm | 87.7 | 84.9 | 81.7 |
| 80/20 Ultra L32E/OPA | 20 ppm | 97.6 | 54.3 | 39.0 |

**based on a formulation cited in WO2012063055A1 OPA (80%) = Octyl Phosphonic Acid (80%) in water/ethanol

| Component | Concentration | Effciency at T = 15 (%) | Average corrosion rate [weight loss] (mils/y) | Average corrosion rate [bubble test] (mils/y) |
|---|---|---|---|---|
| 80/20 Miranol Ultra L32E/Fentacare 1021-80 & 2% sodium thiosulfate** | 20 ppm | 99.6 | 40.32 | 27.5 |
| Fentacare D1021-80 | 20 ppm | 90.5 | 80.3 | 75.6 |
| Tall Oil Aminoethyl Imidazoline | 20 ppm | 98.3 | 48.3 | 50.9 |
| LPA (100%) | 20 ppm | 98.5 | 58.5 | 33.4 |
| LPA (100%) | 4 ppm | 27.6 | 146.8 | 174.2 |
| Miranate LEC-80 | 20 ppm | 74.1 | 100.8 | 88.6 |
| 80/20 LEC-80/LPA | 20 ppm | 96.5 | 46.6 | 39.5 |
| Mackam LSB-50 | 20 ppm | 0 | 211.7 | 223.1 |
| 80/20 LSB-50/LPA | 20 ppm | 96.5 | 51.3 | 41.1 |
| Mackterra V4092-MB | 20 ppm | 95.9 | 56.5 | 42.7 |
| 80/20 V4092-MB/LPA | 20 ppm | 99.7 | 50.7 | 31.1 |
| Geropon HW 15 | 20 ppm | 89.2 | 68.2 | 62.7 |
| 80/20 HW15/LPA | 20 ppm | 99.2 | 47.3 | 35.3 |
| Miranol Ultra L32E | 20 ppm | 87.7 | 84.9 | 81.7 |
| 80/20 Ultra L32E/LPA | 20 ppm | 99.1 | 40.8 | 33.8 |

**based on a formulation cited in WO2012063055A1 LPA (100%) = Lauryl Phosphonic Acid The persistence of the surfactant corrosion inhibitor film was also assessed under high shear rates (4000 rpm). Results are provided in the following tables for the alkyl phosphonic acids and selected surfactant corrosion inhibitors.

| Component | Concentration | Effciency at T = 15 (%) | Average corrosion rate [weight loss] (mils/y) | Average corrosion rate [bubble test] (mils/y) |
|---|---|---|---|---|
| 80/20 Miranol Ultra L32E/Fentacare 1021-80 & 2% sodium thiosulfate** | 20 ppm | 99.6 | 40.32 | 27.5 |
| Tall Oil Aminoethyl Imidazoline | 20 ppm | 93.0 | 83.7 | 75.9 |
| OPA (80%) | 20 ppm | 96.3 | 48.1 | 49.1 |
| OPA (80%) | 4 ppm | 0 | 244.3 | 267.4 |
| Miranate LEC-80 | 20 ppm | 74.1 | 100.8 | 88.6 |
| 80/20 LEC-80/OPA | 20 ppm | 94.5 | 46.6 | 43.9 |
| Mackam LSB-50 | 20 ppm | 0 | 211.7 | 223.1 |
| 80/20 LSB-50/OPA | 20 ppm | 96.8 | 46.4 | 42.7 |
| Mackterra V4092-MB | 20 ppm | 95.9 | 56.5 | 42.7 |
| 80/20 V4092-MB/OPA | 20 ppm | 97.6 | 56.9 | 38.5 |
| Geropon HW 15 | 20 ppm | 89.2 | 68.2 | 62.7 |
| 80/20 HW15/OPA | 20 ppm | 94.1 | 51.1 | 43.1 |
| Miranol Ultra L32E | 20 ppm | 87.7 | 84.9 | 81.7 |
| 80/20 Ultra L32E/OPA | 20 ppm | 97.6 | 54.3 | 39.0 |

**based on a formulation cited in WO2012063055A1

| Component | Concentration | Effciency at T = 15 (%) | Average corrosion rate [weight loss] (mils/y) | Average corrosion rate [bubble test] (mils/y) |
|---|---|---|---|---|
| 80/20 Miranol Ultra L32E/Fentacare 1021-80 & 2% sodium thiosulfate** | 20 ppm | 99.6 | 40.32 | 27.5 |
| Tall Oil Aminoethyl Imidazoline | 20 ppm | 93.0 | 83.7 | 75.9 |
| Rhodafac LPA-100P | 20 ppm | 98.5 | 58.5 | 33.4 |
| Rhodafac LPA-100P | 4 ppm | 27.6 | 146.8 | 174.2 |
| Miranate LEC-80 | 20 ppm | 74.1 | 100.8 | 88.6 |
| 80/20 LEC-80/LPA | 20 ppm | 96.5 | 46.6 | 39.5 |
| Mackam LSB-50 | 20 ppm | 0 | 211.7 | 223.1 |
| 80/20 LSB-50/LPA | 20 ppm | 96.5 | 51.3 | 41.1 |
| Mackterra V4092-MB | 20 ppm | 95.9 | 56.5 | 42.7 |
| 80/20 V4092-MB/LPA | 20 ppm | 99.7 | 50.7 | 31.1 |
| Geropon HW 15 | 20 ppm | 89.2 | 68.2 | 62.7 |
| 80/20 HW15/LPA | 20 ppm | 99.2 | 47.3 | 35.3 |
| Miranol Ultra L32E | 20 ppm | 87.7 | 84.9 | 81.7 |
| 80/20 Ultra L32E/LPA | 20 ppm | 99.1 | 40.8 | 33.8 |

**based on a formulation cited in WO2012063055A1

Immersion Corrosion Tests

The weight loss values were calculated by subtracting the final coupon weights from their respective initial weight. The corrosion rate in mils/year was obtained by calculating the corrosion rate in mg/m$^2$/day using the following equation:

Corrosion rate (mg/cm$^2$/day)=Weight loss(mg)÷surface area of coupon ([cm]↑2)÷100)÷test duration(days)

The corrosion rate was then calculated using the following formula to give mils/year:

((mg/sqdm)/day×1.44)÷density of coupon=mils/year

Corrosion rates for alkyl phosphonic acids and selected co-surfactants are given in the following tables at neutral pH (7.0-8.0).

The immersion corrosion data (carbon steel coupons) are for selected surfactants with OPA/LPA (1000 ppm total active) in SMOW at 40° C. and in NACE brine at 40° C.

| System | Corrosion Rates | | |
|---|---|---|---|
| | Weight loss (mg) | mils/ year | % Weight Loss |
| 1 Day | | | |
| SMOW (Un-inhibited brine) | 2 | 1.55 | 0.01 |
| MACKTERRA V4092/MB | 1.4 | 1.08 | 0.01 |
| 80/20 MACKTERRA V4092/MB and OPA | 2.2 | 1.70 | 0.01 |
| MIRANOL ULTRA L-32E | 0.2 | 0.15 | 0.00 |
| 80/20 MIRANOL ULTRA L-32E and OPA | 0.6 | 0.40 | 0.00 |
| GEROPON HW15 | 1.8 | 1.39 | 0.01 |
| 80/20 GEROPON HW15 and OPA | 2.5 | 1.93 | 0.02 |
| 3 Days | | | |
| SMOW (Un-inhibited brine) | 7.6 | 7.6 | 0.05 |
| MACKTERRA V4092/MB | 5.3 | 1.23 | 0.04 |
| 80/20 MACKTERRA V4092/MB and OPA | 6.4 | 1.49 | 0.04 |
| MIRANOL ULTRA L-32E | 2.2 | 0.51 | 0.01 |
| 80/20 MIRANOL ULTRA L-32E and OPA | 3.9 | 0.91 | 0.03 |
| GEROPON HW15 | 5.1 | 1.19 | 0.03 |
| 80/20 GEROPON HW15 and OPA | 6.0 | 1.40 | 0.04 |
| 7 Days | | | |
| SMOW (Un-inhibited brine) | 17.8 | 1.74 | 0.12 |
| MACKTERRA V4092/MB | 12.4 | 1.21 | 0.08 |
| 80/20 MACKTERRA V4092/MB and OPA | 13.0 | 1.27 | 0.09 |
| MIRANOL ULTRA L-32E | 3.5 | 0.34 | 0.02 |
| 80/20 MIRANOL ULTRA L-32E and OPA | 6.0 | 0.59 | 0.04 |
| GEROPON HW15 | 10.9 | 1.07 | 0.07 |
| 80/20 GEROPON HW15 and OPA | 10.2 | 1.00 | 0.07 |
| 28 Days | | | |
| SMOW (Un-inhibited brine) | 61.8 | 1.49 | 0.42 |
| MACKTERRA V4092/MB | 44.5 | 1.08 | 0.3 |
| 80/20 MACKTERRA V4092/MB and OPA | 42.8 | 1.03 | 0.29 |
| MIRANOL ULTRA L-32E | 19.3 | 0.47 | 0.13 |
| 80/20 MIRANOL ULTRA L-32E and OPA | 24.1 | 0.58 | 0.16 |
| GEROPON HW15 | 33.6 | 0.81 | 0.23 |
| 80/20 GEROPON HW15 and OPA | 30.7 | 0.74 | 0.21 |

OPA = Octyl Phosphonic Acid

| System | Corrosion Rates | | |
|---|---|---|---|
| | Weight loss (mg) | mils/ year | % Weight Loss |
| 1 Day | | | |
| SMOW (Un-inhibited brine) | 2 | 1.55 | 0.01 |
| MACKTERRA V4092/MB | 1.4 | 1.08 | 0.01 |
| 80/20 MACKTERRA V4092/MB and LPA | 1.8 | 1.39 | 0.01 |
| MIRANOL ULTRA L-32E | 0.2 | 0.15 | 0.00 |
| 80/20 MIRANOL ULTRA L-32E and LPA | 0.6 | 0.46 | 0.00 |
| GEROPON HW15 | 1.8 | 1.39 | 0.01 |
| 80/20 GEROPON HW15 and LPA | 2.2 | 1.70 | 0.01 |
| 3 Days | | | |
| SMOW (Un-inhibited brine) | 7.6 | 7.6 | 0.05 |
| MACKTERRA V4092/MB | 5.3 | 1.23 | 0.04 |
| 80/20 MACKTERRA V4092/MB and LPA | 5.3 | 1.23 | 0.04 |
| MIRANOL ULTRA L-32E | 2.2 | 0.51 | 0.01 |
| 80/20 MIRANOL ULTRA L-32E and LPA | 2.6 | 0.61 | 0.02 |
| GEROPON HW15 | 5.1 | 1.19 | 0.03 |
| 80/20 GEROPON HW15 and LPA | 6.2 | 1.44 | 0.04 |
| 7 Days | | | |
| SMOW (Un-inhibited brine) | 17.8 | 1.74 | 0.12 |
| MACKTERRA V4092/MB | 12.4 | 1.21 | 0.08 |
| 80/20 MACKTERRA V4092/MB and LPA | 11.3 | 1.10 | 0.08 |
| MIRANOL ULTRA L-32E | 3.5 | 0.34 | 0.02 |
| 80/20 MIRANOL ULTRA L-32E and LPA | 3.5 | 0.34 | 0.02 |
| GEROPON HW15 | 10.9 | 1.07 | 0.07 |
| 80/20 GEROPON HW15 and LPA | 11.3 | 1.10 | 0.08 |
| 28 Days | | | |
| SMOW (Un-inhibited brine) | 61.8 | 1.49 | 0.42 |
| MACKTERRA V4092/MB | 44.5 | 1.08 | 0.30 |
| 80/20 MACKTERRA V4092/MB and LPA | 41.1 | 0.99 | 0.28 |
| MIRANOL ULTRA L-32E | 19.3 | 0.47 | 0.13 |
| 80/20 MIRANOL ULTRA L-32E and LPA | 21 | 0.51 | 0.14 |
| GEROPON HW15 | 33.6 | 0.81 | 0.23 |
| 80/20 GEROPON HW15 and LPA | 33.9 | 0.82 | 0.23 |

LPA = Lauryl Phosphonic Acid

| System | Corrosion Rates | | |
|---|---|---|---|
| | Weight loss (mg) | mils/ year | % Weight Loss |
| 1 Day | | | |
| NACE (Un-inhibited brine) | 2.0 | 1.55 | 0.01 |
| MACKTERRA V4092/MB | 1.6 | 1.24 | 0.01 |
| 80/20 MACKTERRA V4092/MB and OPA | 0.8 | 0.62 | 0.01 |
| MIRANOL ULTRA L-32E | 0.4 | 0.31 | 0.00 |
| 80/20 MIRANOL ULTRA L-32E and OPA | 0.5 | 0.39 | 0.00 |
| GEROPON HW15 | 1.1 | 0.85 | 0.01 |
| 80/20 GEROPON HW15 and OPA | 0.4 | 0.31 | 0.00 |
| 3 Days | | | |
| NACE (Un-inhibited brine) | 6.0 | 1.40 | 0.04 |
| MACKTERRA V4092/MB | 5.0 | 1.16 | 0.03 |
| 80/20 MACKTERRA V4092/MB and OPA | 3.8 | 0.89 | 0.03 |
| MIRANOL ULTRA L-32E | 0.4 | 0.09 | 0.00 |
| 80/20 MIRANOL ULTRA L-32E and OPA | 1.9 | 0.44 | 0.01 |
| GEROPON HW15 | 3.9 | 0.91 | 0.03 |
| 80/20 GEROPON HW15 and OPA | 1.7 | 0.40 | 0.01 |
| 7 Days | | | |
| NACE (Un-inhibited brine) | 11.8 | 1.15 | 0.08 |
| MACKTERRA V4092/MB | 9.9 | 0.97 | 0.07 |
| 80/20 MACKTERRA V4092/MB and OPA | 6.9 | 0.67 | 0.05 |
| MIRANOL ULTRA L-32E | −0.5 | −0.05 | 0.00 |
| 80/20 MIRANOL ULTRA L-32E and OPA | 2.8 | 0.27 | 0.02 |
| GEROPON HW15 | 7.7 | 0.75 | 0.05 |
| 80/20 GEROPON HW15 and OPA | 6.8 | 0.66 | 0.05 |
| 4 Days | | | |
| NACE (Un-inhibited brine) | 34.6 | 0.84 | 0.23 |
| MACKTERRA V4092/MB | 32.9 | 0.80 | 0.22 |
| 80/20 MACKTERRA V4092/MB and OPA | 27.3 | 0.66 | 0.18 |
| MIRANOL ULTRA L-32E | 18.4 | 0.44 | 0.12 |
| 80/20 MIRANOL ULTRA L-32E and OPA | 20.6 | 0.5 | 0.14 |
| GEROPON HW15 | 27.3 | 0.66 | 0.18 |
| 80/20 GEROPON HW15 and OPA | 22.7 | 0.55 | 0.15 |

Negative values indicated deposition of residues on the coupon caused by the precipitation of the alkyl phosphonate in the brine (Krafft point).

| System | Corrosion Rates | | |
|---|---|---|---|
| | Weight loss (mg) | mils/ year | % Weight Loss |
| 1 Day | | | |
| NACE (Un-inhibited brine) | 2.0 | 1.55 | 0.01 |
| MACKTERRA V4092/MB | 1.6 | 1.24 | 0.01 |
| 80/20 MACKTERRA V4092/MB and LPA | 1.2 | 0.93 | 0.01 |

-continued

| System | Corrosion Rates | | |
|---|---|---|---|
| | Weight loss (mg) | mils/ year | % Weight Loss |
| MIRANOL ULTRA L-32E | 0.4 | 0.09 | 0.00 |
| 80/20 MIRANOL ULTRA L-32E and LPA | 0.5 | 0.39 | 0.00 |
| GEROPON HW15 | 1.1 | 0.85 | 0.01 |
| 80/20 GEROPON HW15 and LPA | 1.6 | 1.24 | 0.01 |
| 3 Days | | | |
| NACE (Un-inhibited brine) | 6.0 | 1.40 | 0.04 |
| MACKTERRA V4092/MB | 5.0 | 1.16 | 0.03 |
| 80/20 MACKTERRA V4092/MB and LPA | 3.8 | 0.89 | 0.03 |
| MIRANOL ULTRA L-32E | 0.4 | 0.09 | 0.00 |
| 80/20 MIRANOL ULTRA L-32E and LPA | 0.7 | 0.16 | 0.00 |
| GEROPON HW15 | 3.9 | 0.91 | 0.03 |
| 80/20 GEROPON HW15 and LPA | 3.9 | 0.91 | 0.03 |
| 7 Days | | | |
| NACE (Un-inhibited brine) | 11.8 | 1.15 | 0.08 |
| MACKTERRA V4092/MB | 9.9 | 0.97 | 0.07 |
| 80/20 MACKTERRA V4092/MB and LPA | 8.1 | 0.79 | 0.05 |
| MIRANOL ULTRA L-32E | −0.05 | −0.05 | 0.00 |
| 80/20 MIRANOL ULTRA L-32E and LPA | 2.8 | 0.27 | 0.02 |
| GEROPON HW15 | 7.7 | 0.75 | 0.05 |
| 80/20 GEROPON HW15 and LPA | 6.8 | 0.66 | 0.05 |
| 28 Days | | | |
| NACE (Un-inhibited brine) | 34.6 | 0.84 | 0.23 |
| MACKTERRA V4092/MB | 32.9 | 0.80 | 0.22 |
| 80/20 MACKTERRA V4092/MB and LPA | 28.9 | 0.70 | 0.20 |
| MIRANOL ULTRA L-32E | 18.4 | 0.44 | 0.12 |
| 80/20 MIRANOL ULTRA L-32E and LPA | 18.3 | 0.44 | 0.12 |
| GEROPON HW15 | 27.3 | 0.66 | 0.18 |
| 80/20 GEROPON HW15 and LPA | 22.8 | 0.55 | 0.15 |

Foam Tests

The results of the dynamic foam tests are given in the following table for selected surfactants and alkyl phosphonic acids These results show foam performance attributes of alkyl phosphonic acids and selected surfactants (1000 ppm active) at ambient temperature (25° C.): 50/50 v/v Isopar M and 5% NaCl

| Surfactant | Time to 1000 ml (secs) | Foam Volume after 10 minutes (ml) |
|---|---|---|
| Tall Oil Aminoethyl Imidazoline (ARMOHIB CI-219) | 135 | 0 |
| MACKTERRA V4092/MB | 66 | 350 |
| MIRANOL ULTRA L-32E | 56 | 420 |
| GEROPON HW-15 | 67 | 100 |
| RHODAFAC RA 600-E | 77 | 10 |
| RHODAFAC PA 35 | 108 | 0 |
| Octyl Phosphonic Acid (80%) | No foam | 0 |
| Lauryl Phosphonic Acid (100%) | No foam | 0 |

RHODAFAC RA 600-E is a C8/10 alcohol ethoxylate phosphate ester.

Emulsification

The results of the emulsification tests are given in the following table.

This shows emulsification attributes of alkyl phosphonic acids and selected surfactants (1000 ppm active) after 30 minutes at ambient temperature (25° C.): 50/50 v/v Isopar M and 5% NaCl

| Surfactant | Brine (ml) @ T = 30 mins | Isopar M (ml) @ T = 30 mins | Pad (ml) @ T = 30 mins | Emulsion Layer (%) |
|---|---|---|---|---|
| Octyl Phosphonic Acid (100%)—OPA | 50 | 50 | 0 | 0 |
| Lauryl Phosphonic Acid (100%)—LPA | 41 | 12** | 0 | 0 |
| FENTACARE 1021-80 (80%) | 40 | 60 | 0 | 60 |
| MIRANOL ULTRA L32-E (32%) | 32 | 0 | 51 | 61.4 |
| 80/20 MIRANOL ULTRA L32-E/OPA | 42 | 0 | 38 | 47.5 |
| 50/50 MIRANOL ULTRA L32-E/OPA | 42 | 0 | 38 | 47.5 |
| 20/80 MIRANOL ULTRA L32-E/OPA | 46 | 15 | 38 | 38.4 |

**Lauryl phosphonic acid appears to gel the hydrocarbon, effectively reducing the phase separation rate of the different layers Discussion The bubble test and RCE results clearly demonstrated the corrosion inhibition properties of the alkyl phosphonic acids (neutralised salt form).

Octyl phosphonic acid was also found to have superior film forming properties compared to other surfactant corrosion inhibitors with hydrophobes of equivalent or higher alkyl chain lengths. For example, under the LPR test conditions used, octyl phosphonic acid was found to have an efficiency greater than 95% compared to surfactants with higher molecular weights, e.g. GEROPON HW15 or tall oil aminoethyl imidazoline (ARMOHIB CI-219). This was even reflected in the film persistence results obtained under high shear conditions.

The reason why alkyl phosphonates exhibit good film persistence attributes is a consequence of the strong binding characteristics of the phosphonate head groups with the surface of the metal. The surfactant forms a physical barrier by chemisorption on the surface of the metal that prevents it from oxidizing.

The alkyl phosphonic acids were, significantly, also found to enhance the corrosion inhibition of surfactants (wetting agents) when they are blended together. For example, replacing 20% of a corrosion inhibitor surfactant (on an active basis) with alkyl phosphonic acid according to the invention boosted the overall corrosion inhibitor efficacy by 10-30%.

A similar effect was also observed for both OPA and LPA (lauryl phosphonic acid) when they are formulated with a surfactant that is not considered to be a corrosion inhibitor. For example, the amphoteric surfactant lauramidopropyl hydroxysultaine does not exhibit any corrosion inhibition properties on its own but a formulation containing at least 20% of the alkyl phosphonic acid salt results in an increase of corrosion inhibition to greater than 95% (after 15 hours) in the bubble tests.

Immersion corrosion tests in different brines also confirmed the alkyl phosphonates reduced the corrosive effects of the medium when used in combination with other surfactants.

Foaming and emulsification tests were also carried out at ambient temperature to assess the suitability of the surfactant in corrosion inhibitor formulations. Surfactants that are classified as low foaming, and which potentially do not produce an emulsion with crude oil, are desirable for corrosion inhibitor applications.

The tested alkyl phosphonic acids were found to produce less stable foams as compared to the corrosion inhibitor surfactants used in the test. This is positive, as it shows they have a low foaming tendency.

The results of the emulsification tests also confirmed the surfactants did not form a stable emulsion with hydrocarbon. This is positive, as it is desired that surfactants used in oil and gas field applications do not emulsify with hydrocarbons.

Wetting Properties

The improvement in the overall corrosion inhibitor performance might be attributed to the wetting of the metallic surface (C1018 carbon steel) by the surfactants.

Wetting is determined by the reduction in the interfacial tension, whether it is a substrate (solid/liquid) or liquid/gas interface by a surfactant. Although the wetting behaviour of surfactants (corrosion inhibitors) can be investigated using a dynamic contact angle analyser (drop profile method), it is possible to assess the interfacial properties by measuring the reduction in surface tension.

Dynamic Surface Tension measurements were therefore carried out using a Messtechnik SITA T60 tensiometer for mixtures of the alkyl phosphonic acids with selected surfactants (anionic and amphoteric) in 5% NaCl.

These tests were carried out using the maximum bubble pressure method (see 'Exploiting Surfactant Synergies in the Development of Foamers for Gas Well Deliqufication', K Hatchman, C Jones, B Downward, G Collins, A Fellows, Proceedings of Chemistry In The Oil Industry XII, Royal Society of Chemistry, 2011).

The surface tensions were measured for 1000 ppm (as active) at a surface age of 30 seconds (equilibrium conditions) and ambient temperature (25° C.). The results are given in the following table, which shows Dynamic Surface Tension measurements for selected surfactants (1000 ppm) and alkyl phosphonic acids in 5% NaCl at ambient temperature (25° C.)

| Component | Surface tension at 30 second (mN/m) |
| --- | --- |
| Octyl Phosphonic Acid (OPA) - potassium salt | 58.5* |
| Lauryl Phosphonic Acid (LPA) - potassium salt | 38.8* |
| MIRANATE LEC-80 | 37.2 |
| 80/20 LEC-80/OPA | 37.2 |
| 80/20 LEC-80/LPA | 34.4 |
| MACKAM LSB-50 | 36.4 |
| 80/20 LSB-50/OPA | 35.4 |
| 80/20 LSB-50/LPA | 27.2 |

*Surfactants exhibit poor solubility in electrolyte solutions.

The alkyl phosphonic acids were observed to produce higher surface tensions compared to the amphoteric surfactant, MACKAM LSB-50 (Lauramidopropyl Hydroxysultaine) and the anionic surfactant, MIRANATE LEC-80 (Sodium Laureth-13 Carboxylate).

When the surfactants were mixed together, however, there was a reduction in the surface tensions compared to the individual surfactants.

Although there was a reduction in surface tension for both alkyl phosphonic acids, the lowest surface tension was obtained with the amphoteric surfactant in combination with the lauryl phosphonic acid. This was not unexpected because anionic surfactants exhibit synergies with amphoteric surfactants, i.e. molecular interaction parameters.

Surface tension reduction by surfactants is an important performance attribute for foamers used in gas well deliquification. Foamer formulations often contain corrosion inhibitors to protect capillary strings and production equipment.

Lauryl phosphonic acid was found to lower the surface tension of the sultaine which does not have any corrosion inhibition properties. When 20% of the active was replaced by the alkyl phosphonate, the corrosion inhibition performance was found to be significantly improved.

Summary

Good corrosion inhibition performance was found for the alkyl phosphonic acids.

The alkyl phosphonic acids were found to exhibit strong adsorption characteristics on metallic surfaces; this ability to provide corrosion inhibition was confirmed by the LPR and RCE bubble tests.

The corrosion inhibition properties are believed to be caused by the phosphonate head group reacting with the metallic surface (chemisorption) to form a film which is persistent even under high shear conditions. The film forming behaviour of the surfactant is not affected by the alkyl chain length, compared to typical surfactant corrosion inhibitors such as betaines. Therefore a range of alkyl phosphonic acids may be used as corrosion inhibitors.

Synergistic properties were also observed when the alkyl phosphonic acids were mixed with co-surfactants. The alkyl phosphonic acids were observed to significantly improve the corrosion inhibition efficiencies of both anionic and amphoteric surfactants, e.g. as seen in the LPR and RCE bubble tests.

The invention claimed is:

1. A method of inhibiting corrosion of a metal component that is in contact with an aqueous fluid containing dissolved gases, in a production zone of an industrial oil or gas well, wherein the method comprises:
applying a compound selected from the group consisting of C2-C30 alkyl phosphonic acids, salts thereof, esters thereof, and mixtures thereof, to the metal component in the production zone or to the aqueous fluid that is in contact with the metal component in the production zone.

2. The method of claim 1, wherein the aqueous fluid contains dissolved hydrogen sulphide and/or carbon dioxide.

3. The method of claim 1, wherein the alkyl phosphonic acid or salt or ester thereof is provided in a formulation in an amount of from 1 to 80 wt %.

4. The method of claim 3, wherein the alkyl phosphonic acid or salt or ester thereof is provided in a formulation in an amount of from 20 to 80 wt %.

5. The method of claim 4, wherein the alkyl phosphonic acid or salt or ester thereof is provided in a formulation in an amount of from 20 to 60 wt %.

6. The method of claim 3, wherein the alkyl phosphonic acid or salt or ester thereof is provided in a formulation in an amount of from 1 to 60 wt %.

7. The method claim 1, wherein the alkyl phosphonic acid or salt or ester thereof is provided together with one or more additional components selected from the group consisting of corrosion inhibitors; co-surfactants that are not alkyl phosphonic acids, salts or esters thereof; alkaline materials; solvents; demulsifiers; preservatives; antifoam agents; scale inhibitors; dispersants; biocides; coupling agents; wetting agents; synergists; weighting agents; and binding agents.

8. The method of claim 7, wherein the alkyl phosphonic acid or salt or ester thereof is provided together with co-surfactant, with the ratio of alkyl phosphonic acid or salt or ester thereof to co-surfactant being from 1:1 to 1:10.

9. The method of claim 8, wherein the ratio of alkyl phosphonic acid or salt or ester thereof to co-surfactant is from 1:1 to 1:8.

10. A formulation suitable for use in industrial hydrocarbon systems, wherein the formulation comprises:
   from 0.1 to 80 wt % of a compound selected from the group consisting of C2-C30 alkyl phosphonic acids, salts thereof, C1-6 alkyl esters thereof, and mixtures thereof; and
   from 0.1 to 80 wt % of co-surfactant selected from the group consisting of anionic surfactants, non-ionic surfactants, cationic surfactants, amphoteric surfactants, and mixtures thereof;
and wherein the formulation has an alkaline pH.

11. A method of inhibiting corrosion of a metal component that is in contact with an aqueous fluid in an industrial hydrocarbon system, wherein the method comprises:
   applying a formulation as defined in claim 10 to the metal component or to the aqueous fluid that is in contact with the metal component.

12. The method of claim 11, wherein the aqueous fluid is in an industrial oil or gas well.

13. The method of claim 12, wherein the industrial oil or gas well is a production well.

14. The formulation of claim 10, wherein the compound is selected from the group consisting of C2-C24 alkyl phosphonic acids, salts thereof, esters thereof, and mixtures thereof.

15. The formulation of claim 14, wherein the compound is selected from the group consisting of C2-C18 alkyl phosphonic acids, salts thereof, esters thereof, and mixtures thereof.

16. The formulation of claim 15, wherein the compound is selected from the group consisting of C4-C18 alkyl phosphonic acids, salts thereof, esters thereof, and mixtures thereof.

17. The formulation of claim 16, wherein the compound is selected from the group consisting of C6-C18 alkyl phosphonic acids, salts thereof, esters thereof, and mixtures thereof.

18. The formulation of claim 16, wherein the compound is selected from the group consisting of C8-C18 alkyl phosphonic acids, salts thereof, esters thereof, and mixtures thereof.

19. The formulation of claim 10, wherein the alkyl group of the alkyl phosphonic acid is branched.

20. The formulation of claim 10, wherein the alkyl group of the alkyl phosphonic acid is straight chain.

* * * * *